United States Patent
Thomas et al.

(10) Patent No.: US 7,085,281 B2
(45) Date of Patent: Aug. 1, 2006

(54) METHOD AND SYSTEM FOR PROCESSING UPSTREAM PACKETS OF AN OPTICAL NETWORK

(75) Inventors: Stephen A. Thomas, Marietta, GA (US); Kevin Bourg, Alpharetta, GA (US); Deven Anthony, Alpharetta, GA (US); Patrick W. Quinn, Lafayette, CA (US); James O. Farmer, Lilburn, GA (US); John J. Kenny, Norcross, GA (US); Thomas A. Tighe, Alpharetta, GA (US); Paul F. Whittlesey, Sugar Hill, GA (US); Emmanuel A. Vella, Alpharetta, GA (US)

(73) Assignee: Wave7 Optics, Inc., Alpharetta, GA (US)

( * ) Notice: Subject to any disclaimer, the term of this patent is extended or adjusted under 35 U.S.C. 154(b) by 952 days.

(21) Appl. No.: 10/045,584

(22) Filed: Oct. 26, 2001

(65) Prior Publication Data

US 2003/0016692 A1 Jan. 23, 2003

Related U.S. Application Data

(63) Continuation-in-part of application No. 09/899,410, filed on Jul. 5, 2001.

(60) Provisional application No. 60/289,112, filed on May 8, 2001, provisional application No. 60/258,837, filed on Dec. 28, 2000, provisional application No. 60/243,978, filed on Oct. 27, 2000, provisional application No. 60/244,052, filed on Oct. 26, 2000.

(51) Int. Cl.
*H04B 7/212* (2006.01)

(52) U.S. Cl. ............ 370/442; 370/321; 370/337; 370/347; 398/135; 398/99; 398/98; 398/35; 359/152; 359/135

(58) Field of Classification Search .......... 370/442, 370/321, 337, 347, 468, 389, 398, 403, 452, 370/458, 460, 521, 395.1, 480, 479, 536, 370/486, 487, 493, 494, 229, 230, 231, 232, 370/235, 395.7, 395.71, 395.72, 412, 428, 370/429, 395.5, 395.41, 395.21, 485, 230.1, 370/77; 359/167, 118, 125, 168, 152, 115, 359/135; 398/22, 23, 24, 130, 128, 79, 68, 398/135, 35, 98, 99

See application file for complete search history.

(56) References Cited

U.S. PATENT DOCUMENTS

| | | |
|---|---|---|
| 4,253,035 A | 2/1981 | Amitay ............... 326/129 |
| 4,654,891 A | 3/1987 | Smith ............... 398/193 |
| 4,665,517 A | 5/1987 | Widmer |
| 4,733,398 A | 3/1988 | Shibagaki et al. ........ 372/31 |
| 4,763,317 A | 8/1988 | Lehman et al. |
| 4,945,541 A | 7/1990 | Nakayama ............ 372/31 |
| 4,956,863 A | 9/1990 | Goss ............... 380/30 |
| 4,975,899 A | 12/1990 | Faulkner |
| 5,105,336 A | 4/1992 | Jacoby et al. ........ 361/609 |
| 5,132,992 A | 7/1992 | Yurt et al. |
| 5,179,591 A | 1/1993 | Hardy et al. |
| 5,247,347 A | 9/1993 | Litteral et al. ........ 725/114 |
| 5,249,194 A | 9/1993 | Sakanushi |
| 5,253,250 A | 10/1993 | Schlafer et al. ........ 370/392 |
| 5,253,275 A | 10/1993 | Yurt et al. |
| 5,325,223 A | 6/1994 | Bears |
| 5,345,504 A | 9/1994 | West, Jr. |
| 5,349,457 A | 9/1994 | Bears |
| 5,365,588 A | 11/1994 | Bianco et al. ........ 380/42 |
| 5,412,498 A | 5/1995 | Arstein et al. |
| 5,469,507 A | 11/1995 | Canetti et al. |
| 5,510,921 A | 4/1996 | Takai et al. |
| 5,528,582 A | 6/1996 | Bodeep et al. |
| 5,534,912 A | 7/1996 | Kostreski ............ 725/106 |
| 5,550,863 A | 8/1996 | Yurt et al. |
| 5,557,317 A | 9/1996 | Nishio et al. ........ 725/92 |
| 5,559,858 A | 9/1996 | Beveridge |
| 5,572,347 A | 11/1996 | Burton et al. ........ 398/71 |
| 5,572,348 A | 11/1996 | Carlson et al. |
| 5,572,349 A | 11/1996 | Hale et al. |
| 5,666,487 A | 9/1997 | Goodman et al. ........ 709/246 |
| 5,701,186 A | 12/1997 | Huber |
| 5,706,303 A | 1/1998 | Lawrence |

| | | | |
|---|---|---|---|
| RE35,774 E | 4/1998 | Moura et al. | 725/118 |
| 5,778,017 A | 7/1998 | Sato et al. | |
| 5,790,523 A | 8/1998 | Ritchie, Jr. et al. | 370/241 |
| 5,793,413 A | 8/1998 | Hylton et al. | 725/81 |
| 5,802,089 A | 9/1998 | Link | |
| 5,861,966 A | 1/1999 | Ortel | |
| 5,875,430 A | 2/1999 | Koether | |
| 5,880,864 A | 3/1999 | Williams et al. | |
| 5,892,865 A | 4/1999 | Williams | |
| 5,969,836 A | 10/1999 | Foltzer | 398/72 |
| 5,974,063 A | 10/1999 | Yoshida | 372/38.02 |
| 6,002,720 A | 12/1999 | Yurt et al. | |
| 6,041,056 A | 3/2000 | Bigham et al. | 370/395.64 |
| 6,097,159 A | 8/2000 | Mogi et al. | |
| 6,097,515 A | 8/2000 | Pomp et al. | 398/45 |
| 6,144,702 A | 11/2000 | Yurt et al. | |
| 6,151,343 A | 11/2000 | Jurgensen | |
| RE37,125 E | 4/2001 | Carlson et al. | |
| 6,295,148 B1 | 9/2001 | Atlas | |
| 6,336,201 B1 | 1/2002 | Geile et al. | 714/755 |
| 6,356,369 B1 | 3/2002 | Farhan | |
| 6,360,320 B1 | 3/2002 | Ishiguro et al. | |
| 6,385,366 B1 | 5/2002 | Lin | |
| 6,421,150 B1* | 7/2002 | Graves et al. | 398/58 |
| 6,424,656 B1* | 7/2002 | Hoebeke | 370/412 |
| 6,427,035 B1 | 7/2002 | Mahony | |
| 6,460,182 B1 | 10/2002 | BuAbbud | |
| 6,463,068 B1 | 10/2002 | Lin et al. | 370/414 |
| 6,483,635 B1 | 11/2002 | Wach | 359/344 |
| 6,486,907 B1 | 11/2002 | Farber et al. | 725/78 |
| 6,507,494 B1 | 1/2003 | Hutchison et al. | 361/704 |
| 6,546,014 B1 | 4/2003 | Kramer et al. | |
| 6,611,522 B1 | 8/2003 | Zheng et al. | 370/395.21 |
| 6,674,967 B1 | 1/2004 | Skrobko et al. | 398/72 |
| 6,680,948 B1 | 1/2004 | Majd et al. | 370/401 |
| 6,807,188 B1* | 10/2004 | Blahut et al. | 370/442 |
| 2001/0002195 A1 | 5/2001 | Fellman et al. | |
| 2001/0002196 A1 | 5/2001 | Fellman et al. | |
| 2001/0002486 A1 | 5/2001 | Kocher et al. | |
| 2001/0004362 A1* | 6/2001 | Kamiya | 370/416 |
| 2001/0030785 A1 | 10/2001 | Pangrac et al. | |
| 2002/0012138 A1* | 1/2002 | Graves et al. | 359/118 |
| 2002/0021465 A1 | 2/2002 | Moore, Jr. et al. | |
| 2002/0027928 A1 | 3/2002 | Fang | 370/468 |
| 2002/0039218 A1 | 4/2002 | Farmer et al. | |
| 2002/0063924 A1* | 5/2002 | Kimbrough et al. | 359/125 |
| 2002/0089725 A1 | 7/2002 | Farmer et al. | |
| 2002/0105965 A1 | 8/2002 | Dravida et al. | 370/463 |
| 2002/0116719 A1* | 8/2002 | Dapper et al. | 725/116 |
| 2002/0135843 A1 | 9/2002 | Gruia | |
| 2002/0141159 A1 | 10/2002 | Bloemen | 361/704 |
| 2002/0164026 A1 | 11/2002 | Huims | |
| 2003/0090302 A1 | 5/2003 | Skrobko et al. | |
| 2003/0128983 A1 | 7/2003 | BuAbbud et al. | 398/71 |
| 2004/0264492 A1* | 12/2004 | Blahut et al. | 370/442 |
| 2005/0123001 A1 | 6/2005 | Craven et al. | 370/486 |

FOREIGN PATENT DOCUMENTS

| | | |
|---|---|---|
| EP | 0 713 347 A2 | 5/1996 |
| EP | 0720322 A2 | 7/1996 |
| EP | 0 566 662 | 11/1999 |
| EP | 0 955 739 A2 | 11/1999 |
| EP | 0 933 892 | 10/2003 |
| JP | 4-504433 | 3/2002 |
| MX | 180038 | 11/1995 |
| TW | 72821 | 8/1995 |
| WO | WO 01/27940 A2 | 4/2001 |
| WO | WO 02/030019 A3 | 4/2002 |
| WO | WO 02/30020 A2 | 4/2002 |
| WO | WO 02/060123 A2 | 8/2002 |

OTHER PUBLICATIONS

"Trading Update and Operational Review Presetation" Marconi, Sep. 4, 2001, pp. 1-35.

"Cable Marker" 2 pgs, Marconi Corporation, PLC, 2000 at www.Marconi.com.

"Communications" 2 pgs, Marconi Corporation, PLC, 2000 at www.Marconi.com.

"Dalton Utilities" 9 pgs, Marconi Corporation, PLC, 2002 at www.Marconi.com.

"Deep Fiber Solutions" 3pgs, Marconi Corporation, PLC, 2000 at www. Marconi.com.

"Deep Fiber HFC Features and Benefits" 1 pg, Marconi Corporation, PLC, 2002 at www. Marconi.com.

"Deep Fiber HFC Network Diagram" 1 pg, Marconi Corporation, PLC, 2002 at www.Marconi.com.

"Deep Fiber HFC Product Overview: New FITL Configuration" 2 pgs, Marconi Corporation , PLC, 2002 at www. Marconi.com.

"Deep Fiber HFC Technical Specifications" 2 pgs, Marconi Corporation, PLC, 2002 at www. Marconi.com.

"Deep Fiber HFC—New PITL Configuration" 1 pg, Marconi Corporation, PLC, 2002 at www.Marconi.com.

"En-Touch" at 5 pgs, Marconi Corporation, PLC, 2002 at www.Marconi.com.

"Fiber to the Home" International Engineering Consortium (no date) pp. 1-10, available at www.iec.com.

"Deep Fiber HFC" Marconi Corporation PLC 2000, pp. 1-2.

"Integrated Voice, Video and Data services Over a Single Fiber. A Compelling Opportunity for Cable Operators" Marconi Corporation PLC, May 2000, 6 pgs.

"Deep Fiber Solutions: Advanced BroadBand Services" Marconi Corporation PLC, May 2000, 5pgs.

"Deep Fiber HFC: A Next-Generation Integrated Access Solution Offering Significant Improvement Over Traditonal HFC Architectures" Marconi Corporation PLC, May 2000, 8pgs.

"A Gold Mine of Opportunities in the Face of Increasing Competition: Choices for Utilities Entering the Communications Marketplace" Marconi Corporation PLC, May 2000, 6pgs.

"Fiber Optics on New Development MDUs: A Research Summary," Marconi Corporation PLC, May 2000 5pgs.

"Thermal Management Challenges: Small ONU Enclosures," Marconi Corporation PLC, May 2000, 9pgs.

"Pasive Optical Networks—Is There Light at the End of the Access Tunnel?" CIBC World Markets Inc., Jan. 11, 2001, pp. 1-66.

"36.2.4 8B/10B transmission code", IEEE 2000, pp. 966-969.

G. Khoe et al., "Coherent Multicarrier Technology for Implementation in the Customer Access," IEEE, May/Jun. 1993, pp. 695-713.

L. Linneil, "A Wide-Band Local Access System Using Emerging-Technology Components," IEEE, Jul. 1986, pp. 612-618.

"Digital BroadBand Delivery system out of Band Transport—Mode B," Society of Cable Telecommunications Engineers, Inc., Aug. 10, 1998, 76 pgs.

"Digital Broadband Delivery System: Out of Band Transport—Mode A," Society of Cable Telecommunications Engineers, Inc., Aug. 26, 1998, 49 pgs.

B. Gaglianello & P. Thompson, "An Efficient MAC Layer Protocol for EPON," IEEE 802.3 EFM Nov. 2001, 9 pgs.

"Polioning and Shaping Overview" *Quality of Services Solutions Configuration Guide*, Cisco Systems, Inc. (No Date).

Cisco IOS™ Software Quality of Service Solutions, Cisco Systems, Inc. 1998, 28 pgs.

International Search Report for PCT/US01/21298, 2 pgs, mailed Jun. 17, 2002.

International Search Report for PCT/US02/03056, 1 pg, mailed Jun. 12, 2002.

"Ethernet—Accelerating the Standard for Speed," 7 pgs, Gigabit Ethernet Alliance, Nov. 2000 www.gigabit-ethernet.org.

"eLuminant—Asynchronous Transfer Mode (ATM) Passive Optical Networks (PONS) Tutoprial" 28 pgs, International Engineering Consortium, 2000 at www.icc.org.

International Search Report dated Dec. 4, 2002 for PCT/US02/27398.

International Search Report Dated Dec. 17, 2002 for PCT/US02/15801.

Global Access ™, Universal Services Gateway, USG100, ARRIS, pp. 1-2, Oct. 18, 2002.

Global Access ™, Universal Access Switch, UA4024, ARRIS, pp. 1-2, Aug. 28, 2002.

Partial International Search Report dated Jan. 3, 2003 for PCT/US01/31032.

International Search Report dated Apr. 22, 2003 for PCT/US01/50361.

L. Zhang et al., "Label-switching architecture for IP traffic over WDM networks", IEE Proc.-Commun. vol. 147, No. 5 Oct. 2000, pp. 269-275.

J. Masip-Torneé et al., "Providing Differentiated Service Categories in Optical Packet Networks", Proceedings of the International Teletraffic Congress, 1999, ITC-16, Teletraffic Engineering In a Competitive World Edinburgh, UK. Jun. 7-11, 1999, Teletraffic Science and Engineering, Amsterdam: Elsevier, NL., vol. 3B, Jun. 7, 1999, pp. 1115-1126.

J. Bannister et al., "How Many Wavelengths Do We Really Need? A Study of the Performance Limits of Packet Over WaveLengths", Optical Networks Magazin, SPIE, Bellingham,WA, vol. 1, No. 2, Apr. 2000, pp. 17-28.

O. W.W. Yang, et al., "All-Optical WDM/TDM Star-Bus Network Using Optical Amplifiers", Journal of Optical Communications, Fachverlage Scheile & Schon, Berlin, DE, vol. 16, No. 6, Dec. 1, 1995, pp. 216-226.

Walter Ciciorn et al., "Modern Cable Television Technology Video, Voice, and Data Communications", © 1999 by Morgan Kaufman Publishers, Inc. pp. 167-176.

International Search Report dated Apr. 21, 2003 for PCT/US02/28734.

Written Opinion dated May 6, 2003 for PCT/US01/21298.

McDevitt et al., Switched vs Broadcast Video for Fiber-to-the Home Systems, Alcatel Network Systems, 1990, IEEE, CH2829-0/90/0000-1109, pp. 1109-1119.

Mangun et al., Fiber to the Home Experience in Southern Bell, BellSouth Services and Northern Telecom, 1988, IEEE, CH2536-1/88/0000-0208, pp. 208-212.

Han et al., Burst-Mode Penalty of AC- Coupled Optical Receivers Optimized for 8B/10B Line Code, 2004, IEEE.

Coppinger et al., Nonlinear Raman Cross-Talk in a Video Overlay Passive Optical Network, 2003, Tuesday Afternoon, OFC 2003, vol. 1, pp. 285-286.

Piehler et al., Nonlinear Raman Crosstalk in a 125-Mb/s CWDM Overlay on a 1310-nm Video Access Network, 2003, Optical Society of America.

Wong et al., 50-dB Nonlinear Crosstalk Suppression in a WDM Analog Fiber System by Complementary Modulation and Balanced Detection, 2003, IEEE, pp. 500-505.

Perkins, The Art of Overlaying Video Services on a BPON, 2004, Bechtel Corporation. pp. 1-9.

International Search Report dated OF Jul. 2, 2003 for PCT/US03/7814.

Angelopoulos J.D. et al, "A Transparent Mac Method for Bandwidth Sharing and CDV Control at the ATM Layer of Passive Optical Netowrks,", Journal of Lighwave Technology, IEEE. New York, US, vol 14, No. 12, Dec. 1, 1996, pp. 2625-2634, XP000642251, ISSN: 0733-8724.

Optical Networks Daily, A Publication of Optical Keyhole, August 26, 2003, pp. 1-13.

International Preliminary Examination Report of Oct. 27, 2003 for PCT/US01/21298.

International Search Report dated Jul. 7, 2003 for PCT/US01/51350.

International Search Report dated Oct. 3, 2003 for PCT/US03/12231.

G. Scott Glasesemann et al., "The Mechanical Reliability of Corning® Optical Fiber in Bending White Paper," Sep. 2002, pp. 1-4.

Corning® SMF-28™ Optical Fiber Product Information, Corning® Single-Mode Optical Fiber," Apr. 2002, pp. 1-4.

Bourne, John "Heathrow—Experience and Evolution" IEEE. 1990, pp. 1091-1095.

Miki, Tetsuya. "A Design Concept on Fiber-Optic Wavelength-Division-Multiplexing Subscriber Loop System" WTG-Fachber. 1980, pp. 41-45.

Yamaguchi, K. "A Broadband Access Network Based on Optical Signal Processing: The Photonic Highway" IEEE. 1990, pp. 1030-1037.

Ciciora, Walter S. et al., "Modern Cable Television Technology: Video, Voice, amd Data Communications", © 1999, pp. 162-214, Chapter 4, Morgan Kaufmann Publishers, Inc., San Francisco, California.

Companie Deutsch, Components for Fiber Optics, "Triplexers—WDM: FSAN—TPM Series", pp. 1-6.

CEDaily Direct News, "Today's Report", Mar. 19, 2001, pp. 1-5.

Lucent Technologies, "Lucent Technologies Introduces Single-Fiber Network Access Devices for Voice, Video and Data Services to the Home or Curb", Jun. 6, 2000, pp. 1-2.

Lucent Technologies, "Agere Systems Introduces Single-Fiber Network Access Devices for Voice, Video and Data Services to the Home or Curb", Mar. 19, 2001, pp. 1-3.

Effenberger et al., "G.983. VideoReturnPath," Oct. 2004, International Telecommunication Union, Telecommunication Standardization Sector, Study Group 15—Contribution 13, pp. 1-18.

International Preliminary Examination Report of Nov. 19, 2003 for PCT/US03/07814.

International Preliminary Report on Patentability of Apr. 1, 2005 for PCT/US01/51350.

International Preliminary Examination Report of Sep. 17, 2004 for PCT/US03/12231.

* cited by examiner

*Primary Examiner*—Wellington Chin
*Assistant Examiner*—Jamal A. Fox
(74) *Attorney, Agent, or Firm*—King & Spalding LLP

(57) ABSTRACT

A protocol for an optical network can control the time at which subscriber optical interfaces of an optical network are permitted to transmit data to a transceiver node. The protocol can prevent collisions of upstream transmissions between the subscriber optical interfaces of a particular subscriber group. With the protocol, a transceiver node close to the subscriber can allocate additional or reduced upstream bandwidth based upon the demand of one or more subscribers. That is, a transceiver node close to a subscriber can monitor (or police) and adjust a subscriber's upstream bandwidth on a subscription basis or on an as-needed basis. The protocol can account for aggregates of packets rather than individual packets. By performing calculation on aggregates of packets, the algorithm can execute less frequently which, in turn, permits its implementation in lower performance and lower cost devices, such as software executing in a general purpose microprocessor.

29 Claims, 9 Drawing Sheets

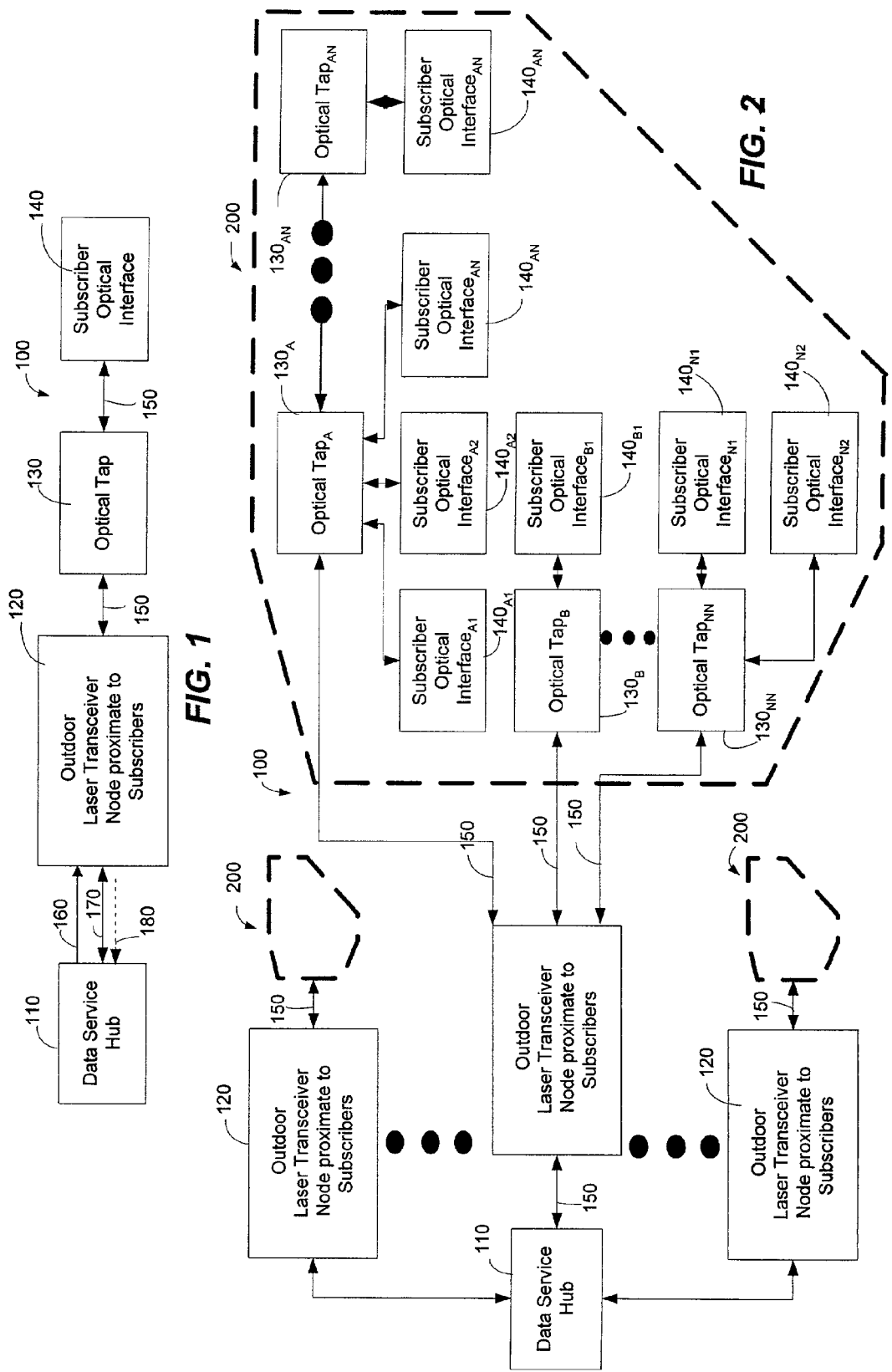

Transceiver Node
120

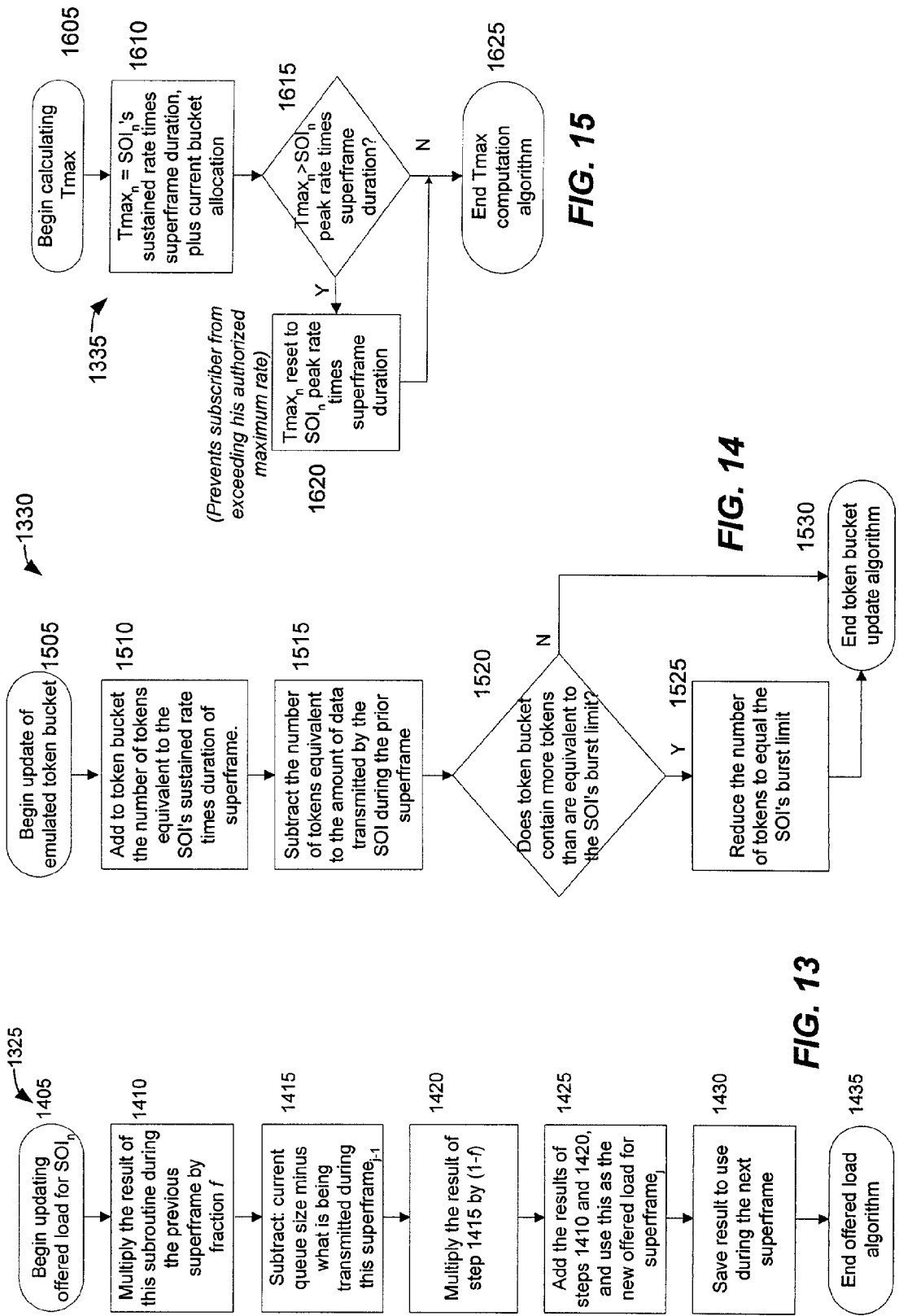

METHOD AND SYSTEM FOR PROCESSING UPSTREAM PACKETS OF AN OPTICAL NETWORK

STATEMENT REGARDING RELATED APPLICATIONS

This application is a continuation-in-part of a non-provisional patent application entitled, "System and Method for Communicating Optical Signals between a Data Service Provider and Subscribers," filed on Jul. 5, 2001 and assigned U.S. application Ser. No. 09/899,410. The present application is also related to non-provisional application entitled, "System and Method for Communicating Optical Signals Upstream and Downstream between a Data Service Provider and Subscribers," filed on Oct. 4, 2001 and assigned U.S. Ser. No. 09/971,363. The present application claims priority to provisional patent application entitled, "Systems to Provide Video, Voice and Data services via Fiber Optic Cable-Part 2," filed on Oct. 26, 2000 and assigned U.S. Application Ser. No. 60/244,052; provisional patent application entitled, "Systems to Provide Video, Voice and Data services via Fiber Optic Cable-Part 3," filed on Dec. 28, 2000 and assigned U.S. Application Ser. No. 60/258,837; provisional patent application entitled, "Protocol to Provide Voice and Data Services via Fiber Optic Cable," filed on Oct. 27, 2000 and assigned U.S. Application Ser. No. 60/243,978; and provisional patent application entitled, "Protocol to Provide Voice and Data Services via Fiber Optic Cable-Part 2," filed on May 8, 2001 and assigned U.S. Application Ser. No. 60/289,112, the entire contents of each of these applications are incorporated by reference.

TECHNICAL FIELD

The present invention relates to video, voice, and data communication. More particularly, the present invention relates to a system and method for communicating upstream optical signals from Subscribers to a data service provider.

BACKGROUND OF INVENTION

The increasing reliance on communication networks to transmit more complex data, such as voice and video traffic, is causing a very high demand for bandwidth. To resolve this demand for bandwidth, communication networks are relying more upon optical fibers to transmit this complex data. Conventional communication architectures that employ coaxial cables are slowly being replaced with communication networks that comprise only fiber optic cables. One advantage that optical fibers have over coaxial cables is that a much greater amount of information can be carried on an optical fiber.

The Fiber-to-the-home (FTTH) optical network architecture has been a dream of many data service providers because of the aforementioned capacity of optical fibers that enable the delivery of any mix of high-speed services to businesses and consumers over highly reliable networks. Related to FTTH is fiber-to-the-business (FTTB). FTTH and FTTB architectures are desirable because of improved signal quality, lower maintenance, and longer life of the hardware involved with such systems. However, in the past, the cost of FTTH and FTTB architectures have been considered prohibitive. But now, because of the high demand for bandwidth and the current research and development of improved optical networks, FTTH and FTTB have become a reality.

A conventional hybrid fiber-to-the-home (FTTH)/hybrid fiber-coax (HFC) architecture has been proposed by the industry. HFC is currently the architecture of choice for many cable television systems. In this FTTH/HFC architecture, an active signal source is placed between the data service hub and the subscriber. Typically, in this architecture, the active source comprises a router. This conventional router typically has multiple data ports that are designed to support individual subscribers. More specifically, the conventional router uses a single port for each respective subscriber. Connected to each data port of the router is an optical fiber which, in turn, is connected to the subscriber. The connectivity between data ports and optical fibers with this conventional FTTH/HFC architecture yield a very fiber intensive last mile. It noted that the terms, "last mile" and "first mile", are both generic terms used to describe the last portion of an optical network that connects to subscribers. Therefore, the distance of a mile should not to be taken literally.

In addition to a high number of optical cables originating from the router, the FTTH/HFC architecture requires radio frequency signals to be propagated along traditional coaxial cables. Because of the use of coaxial cables, numerous radio frequency (RF) amplifiers are needed between the subscriber and the data service help. For example, RF amplifiers are typically needed every one to three kilometers in a coaxial type system.

The use of coaxial cables and the FTTH/HFC architecture adds to the overall cost of the system because two separate and distinct networks are present in such an architecture. In other words, the FTTH/HFC architecture has high maintenance cost because of the completely different wave guides (coaxial cable in combination with optical fiber) in addition to the electrical and optical equipment needed to support such two distinct systems. Stated more simply, the FTTH/HFC architecture merely combines an optical network with an electrical network with both networks running independently of one another.

One problem with the electrical network in the FTTH/HFC architecture involves cable modem technology which supports the data communications between the data service provider and the subscriber. The data service subscriber typically employs a cable modem termination system (CMTS) to originate downstream data communications that are destined to the subscriber. To receive these downstream data communications, the subscriber will typically use a cable modem that operates according to a particular protocol known in the industry as Data-Over-Cable-Service-Interface-Specification (DOCSIS). The DOCSIS protocol defines service flows, which are identifications assigned to groups of packets by the CMTS for the downstream flows based on an inspection of a number of parameters in a packet.

More specifically, a service flow is media access control (MAC)-layer transport service that provides unique directional transport of packets either to upstream packets transmitted by the cable modem or to downstream packets transmitted by the CMTS. The identifications assigned to groups of packets in the DOCSIS protocol can include parameters such as TCP, UTP, IP, LLC, and 802.1 P/Q identifiers contained in an incoming packet.

Based on these identifications, the CMTS assigns a service flow ID (SFID) to a particular datastream. A service flow typically exists when the CMTS assigns this SFID to a datastream. The SFID serves as the principle identifier in the CMTS for the service flow. A service flow is characterized by at least an SFID and an associated direction.

A SFID is usually assigned when a user wishes to communicate. When the user relinquishes the communications channel, the SFID ceases to exist, and if all sessions are closed, all communications with that particular modem cease. When the modem needs to communicate again, it typically must contend for a timeslot in which is then asks for bandwidth. Thus, there will be some delay before communication can restart. This delay may or may not be noticeable to a user, depending on system loading and the nature of the application.

Communication via cable modem is asymmetrical. That is, the data rate that can be achieved in the downstream direction is greater than that which may be achieved in the upstream direction. This is adequate for certain types of communications, such as web surfing. But it is not efficient for other types of services, such as peer-to-peer file transfer (e.g., digital audio file transfers such as Napster type services), nor is it good for large email attachments. This asymmetrical communication is a consequence of using coaxial cable with the need to restrict return signals to low frequencies.

Accordingly, there is a need in the art for a system and method for communicating optical signals between a data service provider and a subscriber that eliminates the use of coaxial cables and related hardware and software necessary to support the data signals propagating along the coaxial cables. There is also need in the art for a system and method for communicating optical signals between a data service provider and a subscriber that can service a large number of subscribers while reducing the number of connections at the data service hub.

There is also a need in the art for a method and system for handling upstream optical communications that can offer guaranteed bandwidth for each subscriber that is part of the optical network. There is a further need in the art for a system and method that can offer guaranteed bandwidth while using any left over portion of this guaranteed bandwidth by placing it in a pool that is accessible by each subscriber. In other words, there is a need in the art for a system and method that can reclaim guaranteed bandwidth among multiple subscribers and place this reclaimed bandwidth in a pool. Another need exists in the art for a system and method that can process group or aggregated packets with token bucket emulation. A further need in the exists for a system and method that can provide a fair allocation of bandwidth to different subscribers where "fair" has a precise mathematical definition. Another need exists in the art for a system and method that can alleviate communication traffic load on an upstream data path.

SUMMARY OF THE INVENTION

The present invention is generally drawn to a system and method for efficient propagation of data and broadcast signals over an optical fiber network. More specifically, the present invention is generally drawn to a method and system for handling upstream optical communications originating from subscribers of an optical network that are transmitted to a data service hub of the optical network. The term "rupstream" can define a communication direction where a subscriber originates a data signal that is sent upwards towards a data service hub of an optical network. Conversely, the term "downstream" can define a communication direction where a data service hub originates a data signal that is sent downwards towards subscribers of an optical network.

The method and system of the present invention can coordinate the operation of subscriber optical interfaces that are typically part of predetermined subscriber groups. The method and system can comprise a protocol that can control the time at which each optical interface is permitted to transmit data to a transceiver node. Such controlling of the time at which optical interfaces of a certain group are permitted to transmit can be referred to as a form of Time Division Multiple Access (TDMA). With TDMA, the protocol can prevent collisions of upstream transmissions between the subscriber optical interfaces of a particular subscriber group.

Unlike protocols and transmitters of the conventional art that have carrier sense or collision detection, the protocol and subscriber optical interfaces of the present invention are not designed to detect or sense transmissions of other optical interfaces of a subscriber group that share the same transceiver node. In other words, the transceiver node executing the protocol of the present invention controls or schedules the time periods in which a subscriber optical interface of a subscriber group is permitted to transmit information to the network.

With the protocol of the present invention, the transceiver node can allocate additional or reduced upstream bandwidth based upon the demand of one or more subscribers. That is, the transceiver node can monitor (or police) and adjust a subscriber's upstream bandwidth on a subscription basis or on an as-needed basis. The transceiver node can offer upstream data bandwidth to the subscriber in preassigned increments. For example, the transceiver node can offer a particular subscriber or groups of subscribers upstream bandwidth in units of 1, 2, 5, 10, 20, 50, 100, 200, and 450 Megabits per second (Mb/s).

One of the components of the transceiver node that executes or runs the protocol of the present invention is an optical tap routing device. The optical tap routing device can determine which optical tap multiplexer is to receive a downstream electrical signal, or identify which of the plurality of optical taps originated an upstream optical signal. The optical tap routing device can format data and implement the protocol required to send and receive data from each individual subscriber connected to a respective optical tap (as will be discussed below). The optical tap routing device can provide a form of centralized control for a group of subscribers. The optical tap routing device can comprise a computer or a hardwired apparatus that executes the program defining the inventive protocol of the present invention.

The algorithm of the present invention can account for aggregates of packets rather than individual packets. By performing calculation on aggregates of packets, the algorithm can execute less frequently which, in turn, permits its implementation in lower performance and lower cost devices. In the present invention, this approach can allow implementation with software executing in a general purpose microprocessor instead of special purpose high-speed hardware.

Unlike conventional token bucket emulation that handles each data packet singly, the computer implemented protocol of the present invention can process grouped or aggregated packets with token bucket emulation. The emulation of a token bucket can enable the inventive protocol to handle bandwidth very efficiently. The token bucket emulation can permit each subscriber of a subscriber group to have a guaranteed bandwidth. However, any portion of guaranteed bandwidth not used by a particular subscriber can be reclaimed by the protocol and offered to other subscribers who may need the bandwidth at a particular instant of time. The reclaimed bandwidth can be offered from a pool of bandwidth that is formed for a subscriber group.

The reclaimed bandwidth, guaranteed bandwidth, and token bucket emulation can comprise functions of several parameters tracked by the inventive protocol: peak rate, sustained rate, burst size, priority weighting, and guaranteed indication (where guaranteed indication tracks whether a subscriber is guaranteed a sustained rate at all times). Unlike the conventional art where the first three parameters of peak rate, sustained rate, and burst size are tracked with hardware, the present invention can monitor these parameters with the inventive protocol that can be executed in software. All of these parameters can be adjusted by the network provider to adapt the optical network to various subscriber environments.

Unlike conventional routers that typically first receive a packet and then use a token bucket algorithm to decide how to handle the received packet, the present invention can be notified of the desire of the subscriber optical interface to send a group of packets and then the optical tap routing device can employ a token bucket algorithm to notify the subscriber optical interface of the number of bytes that the optical tap routing device can receive. That is, the optical tap routing device can use the token bucket algorithm to determine whether a subscriber optical interface can send (a) all of the packets it wants to send, or (b) some of the packets it wants to send, or (c) none of the packets it wants to send. If the subscriber optical interface cannot send all the packets it wants to send, it can make a decision to either drop the packets or to hold them and try to send them at later time.

In this way, upstream data traffic can be managed more efficiently. Upstream information can be taken off the incoming data path: if a packet is not going to be accepted by the optical tap routing device, the subscriber optical interface doesn't send it. Stated differently, the packets at the subscriber optical interface can be retained for transmission in the next transmission window (referred to later as a superframe). If the memory that retains the packet is full, no more packets are accepted from the user's equipment by the transceiver node.

Furthermore, the optical tap routing device can further make the decision of whether or not to allow the subscriber optical interface to send the packet(s), based not only on the type of packet and the data load from the sending subscriber optical interface, but it also on how much data other subscriber optical interfaces in the same subscriber group want to send, and the service level to be provided to each subscriber optical interface (such as based on what amount the subscriber is paying for service, or other criteria defined by the operator).

Additionally, the decision on how many packets to accept can be based on not only the total load presented by that group of subscriber optical interfaces (which share a common path coming into the optical tap routing device), but also on what is known about the total load that is going to be leaving the optical tap routing device, destined for the data service hub.

In one exemplary embodiment, there can be six logical groups of subscribers, each feeding data into the optical tap routing device. There are typically one to four data paths leaving the optical tap routing device, going to the data service hub. The optical tap routing device can forecast its total load from the six logical groups, and decide whether it can accept all packets and forward them on to the data service hub, or whether it will only be able to accept a subset of the packets offered. If the optical tap routing device accepted them all, it would not be able to forward all of them to the data service hub.

While the determination of whether to accept subscriber optical interface packets can permit the inventive protocol to allocate bandwidth efficiently and with software, the present invention can also provide centralized control of upstream traffic and a fair allocation of bandwidth between groups of subscribers, where "fair" can have a mathematical definition. The mathematical definition of "fair" can comprise a weighted max-min algorithm. In this algorithm, a weight factor can comprise the product of provisioned weight and a low-pass filtered measurement of buffer occupancy for each subscriber optical interface of a group of subscriber optical interfaces. The max-min parameter for each subscriber optical interface can comprise its maximum allocation.

Max-min fairness maximizes the minimum that any subscriber is forced to accept. In other words, the result of a max-min allocation is that the subscriber that receives the smallest allocation is assured that he could not have been given a greater allocation without some other subscriber receiving even less than he did. A weighed max-min allocation assigns each party a relative weighting factor. It maximizes the minimum of that weighting factor multiplied by the allocation, and provides a rigorous way to bias the max-min allocation in favor of parties with more priority.

BRIEF DESCRIPTION OF THE DRAWINGS

FIG. 1 is a functional block diagram of some of the core components of an exemplary optical network architecture according to the present invention.

FIG. 2 is a functional block diagram illustrating an exemplary optical network architecture for the present invention.

FIG. 13 is a logic flow diagram illustrating a more detailed exemplary subprocess of step 1325 in FIG. 12.

FIG. 14 is a logic flow diagram illustrating a more detailed exemplary subprocess of step 1330 in FIG. 12.

FIG. 15 is a logic flow diagram illustrating a more detailed exemplary subprocess of step 1335 in FIG. 12.

DETAILED DESCRIPTION OF EXEMPLARY EMBODIMENTS

Figure 3:
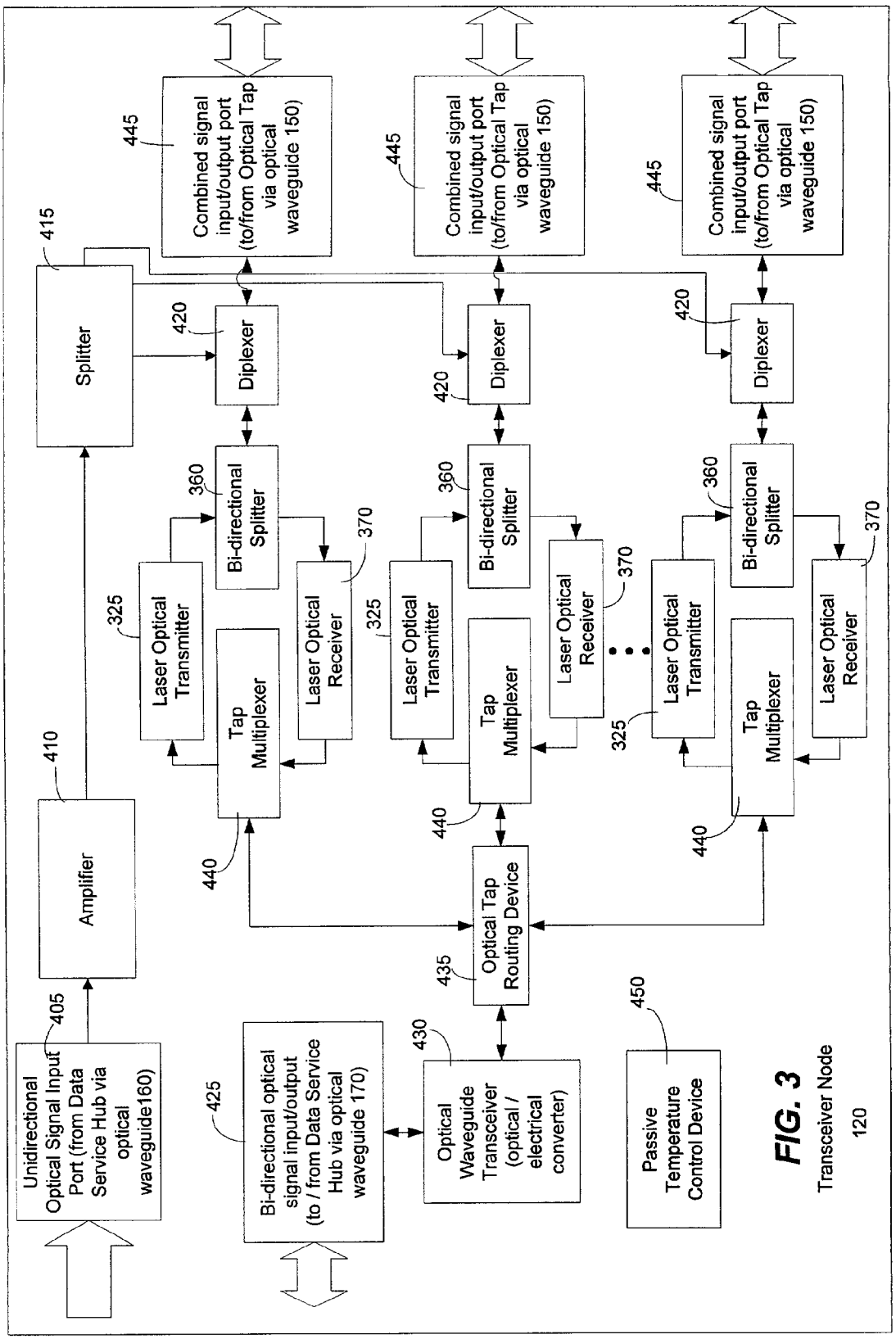
FIG. 3 is a functional block diagram illustrating an exemplary transceiver node according to the present invention.

The present invention may be embodied in software or hardware or a combination thereof disposed within an optical network. The present invention can comprise a transceiver node that further comprises an optical tap routing device and a plurality of optical tap multiplexers for receiving upstream packets from one or more subscriber optical interfaces. Unlike conventional token bucket emulation that handles data packets in a single manner, the protocol of the present invention can process aggregates of data packets with token bucket emulation. With the protocol of the present invention, a transceiver node can allocate additional or reduced upstream bandwidth based upon the demand of one or more subscribers. The present invention can monitor and adjust a subscriber's upstream bandwidth on a subscription basis or on an as-needed basis. The present invention can permit each subscriber of a subscriber group to have a guaranteed bandwidth. However, most portions of guaranteed bandwidth not used by a particular subscriber can be reclaimed by the protocol and offered to other subscribers who may need the bandwidth at a particular instant of time.

Referring now to the drawings in which like numerals represent like elements throughout the several figures, aspects of the present invention and the illustrative operating environment will be described.

FIG. 1 is a functional block diagram illustrating an exemplary optical network architecture 100 according to the present invention. The exemplary optical network architecture 100 comprises a data service hub 110 that is connected to one or more transceiver nodes 120. The transceiver nodes 120, in turn, are connected to an optical taps 130. The term "transceiver node" can refer to nodes as described in copending application titled, "System and Method for Communicating Optical Signals Between A Data Service Provider and Subscribers," Ser. No. 09/899,410, filed on Jul. 5, 2001 and copending application titled, "System and Method for Communicating Optical Signals Upstream and Downstream between a Data Service Provider and Subscribers," filed on Oct. 4, 2001 and assigned U.S. Ser. No. 09/971,363, the contents of these two applications are herein incorporated by reference.

The optical taps 130 can be connected to a plurality of subscriber optical interfaces 140. Between respective components of the exemplary optical network architecture 100 are optical waveguides such as optical waveguides 150, 160, 170, and 180. The optical waveguides 150–180 are illustrated by arrows where the arrowheads of the arrows illustrate exemplary directions of data flow between respective components of the illustrative and exemplary optical network architecture 100. While only an individual transceiver node 120, an individual optical tap 130, and an individual subscriber optical interface 140 are illustrated in FIG. 1, as will become apparent from FIG. 2 and its corresponding description, a plurality of transceiver nodes 120, optical taps 130, and subscriber optical interfaces 140 can be employed without departing from the scope and spirit of the present invention. Typically, in many of the exemplary embodiments of the present invention, multiple subscriber optical interfaces 140 are connected to one or more optical taps 130.

The transceiver node 120 can allocate additional or reduced bandwidth based upon the demand of one or more subscribers that use the subscriber optical interfaces 140. The transceiver node 120 can be designed to withstand outdoor environmental conditions and can be designed to hang on a strand or fit in a pedestal or "hand hole." The transceiver node can operate in a temperature range between minus 40 degrees Celsius to plus 60 degrees Celsius. The transceiver node 120 can operate in this temperature range by using passive cooling devices that do not consume power.

Unlike the conventional routers disposed between the subscriber optical interface 140 and data service hub 110, the transceiver node 120 does not require active cooling and heating devices that control the temperature surrounding the transceiver node 120. The present invention places more of the decision-making electronics at the transceiver node 120 rather than at the subscriber optical interface 140. Typically, the decision-making electronics are larger in size and more costly than the electronics placed in the subscriber optical interface 140 of the present invention.

Because the transceiver node 120 does not require active temperature controlling devices, the transceiver node 120 lends itself to a compact electronic packaging volume that is typically smaller than the environmental enclosures of conventional routers.

In one exemplary embodiment of the present invention, three trunk optical waveguides 160, 170, and 180 (that can comprise optical fibers) can conduct optical signals from the data service hub 110 to the transceiver node 120. It is noted that the term "optical waveguide" used in the present application can apply to optical fibers, planar light guide circuits, and fiber optic pigtails and other like optical waveguides.

A first optical waveguide 160 can carry broadcast video and other signals. The signals can be carried in a traditional cable television format wherein the broadcast signals are modulated onto carriers, which in turn modulate an optical transmitter (not shown) in the data service hub 110. A second optical waveguide 170 can carry downstream targeted services such as data and telephone services to be delivered to one or more subscriber optical interfaces 140. In addition to carrying subscriber-specific optical signals, the second optical waveguide 170 can also propagate internet protocol broadcast packets, as is understood by those skilled in the art.

In one exemplary embodiment, a third optical waveguide 180 can transport data signals upstream from the transceiver node 120 to the data service hub 110. The optical signals propagated along the third optical waveguide 180 can also comprise data and telephone services received from one or more subscribers. Similar to the second optical waveguide 170, the third optical waveguide 180 can also carry IP broadcast packets, as is understood by those skilled in the art.

The third or upstream optical waveguide 180 is illustrated with dashed lines to indicate that it is merely an option or part of one exemplary embodiment according to the present invention. In other words, the third optical waveguide 180 can be removed. In another exemplary embodiment, the second optical waveguide 170 propagates optical signals in both the upstream and downstream directions as is illustrated by the double arrows depicting the second optical waveguide 170. In such an exemplary embodiment where the second optical waveguide 170 propagates bidirectional optical signals, only two optical waveguides 160, 170 would be needed to support the optical signals propagating between the data server's hub 110 in the transceiver node 120. In another exemplary embodiment (not shown), a single optical waveguide can be the only link between the data service hub 110 and the transceiver node 120. In such a single optical waveguide embodiment, three different wavelengths can be used for the upstream and downstream signals. Alternatively, bidirectional data could be modulated on one wavelength.

In one exemplary embodiment, the optical tap 130 can comprise an 8-way optical splitter. This means that the optical tap 130 comprising an 8-way optical splitter can divide downstream optical signals eight ways to serve eight different subscriber optical interfaces 140. In the upstream direction, the optical tap 130 can combine the optical signals received from the eight subscriber optical interfaces 140.

In another exemplary embodiment, the optical tap 130 can comprise a 4-way splitter to service four subscriber optical interfaces 140. Yet in another exemplary embodiment, the optical tap 130 can further comprise a 4-way splitter that is also a pass-through tap meaning that a portion of the optical signal received at the optical tap 130 can be extracted to serve the 4-way splitter contained therein while the remaining optical energy is propagated further downstream to another optical tap or another subscriber optical interface 140. The present invention is not limited to 4-way and 8-way optical splitters. Other optical taps having fewer or more than 4-way or 8-way splits are not beyond the scope of the present invention.

Referring now to FIG. 2, this Figure is a functional block diagram illustrating an exemplary optical network architecture 100 that further includes subscriber groupings 200 that correspond with a respective transceiver node 120. FIG. 2 illustrates the diversity of the exemplary optical network architecture 100 where a number of optical waveguides 150 connected between the transceiver node 120 and the optical taps 130 is minimized. FIG. 2 also illustrates the diversity of subscriber groupings 200 that can be achieved with the optical tap 130.

Each optical tap 130 can comprise an optical splitter. The optical tap 130 allows multiple subscriber optical interfaces 140 to be coupled to a single optical waveguide 150 that is connected to the transceiver node 120. In one exemplary embodiment, six optical fibers 150 are designed to be connected to the transceiver node 120. Through the use of the optical taps 130, sixteen subscribers can be assigned to each of the six optical fibers 150 that are connected to the transceiver node 120.

In another exemplary embodiment, twelve optical fibers 150 can be connected to the transceiver node 120 while eight subscriber optical interfaces 140 are assigned to each of the twelve optical fibers 150. Those skilled in the art will appreciate that the number of subscriber optical interfaces 140 assigned to a particular waveguide 150 that is connected between the transceiver node 120 and a subscriber optical interface 140 (by way of the optical tap 130) can be varied or changed without departing from the scope and spirit of the present invention. Further, those skilled in the art recognize that the actual number of subscriber optical interfaces 140 assigned to the particular fiber optic cable is dependent upon the amount of power available on a particular optical fiber 150.

As depicted in subscriber grouping 200, many configurations for supplying communication services to subscribers are possible. For example, while optical tap $130_A$ can connect subscriber optical interfaces $140_{A1}$ through subscriber optical interface $140_{AN}$ to the laser transmitter node 120, optical tap $130_A$ can also connect other optical taps 130 such as optical tap $130_{AN}$ to the transceiver node 120. The combinations of optical taps 130 with other optical taps 130 in addition to combinations of optical taps 130 with subscriber optical interfaces 140 are limitless. With the optical taps 130, concentrations of distribution optical waveguides 150 at the transceiver node 120 can be reduced. Additionally, the total amount of fiber needed to service a subscriber grouping 200 can also be reduced.

With the active transceiver node 120 of the present invention, the distance between the transceiver node 120 and the data service hub 110 can comprise a range between 0 and 80 kilometers. However, the present invention is not limited to this range. Those skilled in the art will appreciate that this range can be expanded by selecting various off-the-shelf components that make up several of the devices of the present system.

Those skilled in the art will appreciate that other configurations of the optical waveguides disposed between the data service hub 110 and transceiver node 120 are not beyond the scope of the present invention. Because of the bidirectional capability of optical waveguides, variations in the number and directional flow of the optical waveguides disposed between the data service hub 110 and the transceiver node 120 can be made without departing from the scope and spirit of the present invention.

Those skilled in the art will appreciate that the selection of optical transmitters comprising optical waveguide transceiver 430 and data service hub 110 for each circuit may be optimized for the optical path lengths needed between the data service hub 110 and the transceiver node 120. Further, those skilled in the art will appreciate that the wavelengths discussed are practical but are only illustrative in nature. In some scenarios, it may be possible to use communication windows at 1310 and 1550 nm in different ways without departing from the scope and spirit of the present invention. Further, the present invention is not limited to a 1310 and 1550 nm wavelength regions. Those skilled in the art will appreciate that smaller or larger wavelengths for the optical signals are not beyond the scope and spirit of the present invention.

Referring now to FIG. 3, this Figure illustrates a functional block diagram of an exemplary transceiver node 120 of the present invention. In this exemplary embodiment, the transceiver node 120 can comprise a unidirectional optical signal input port 405 that can receive optical signals propagated from the data service hub 110 that are propagated along a first optical waveguide 160. The optical signals received at the unidirectional optical signal input port 405 can comprise broadcast video data. The optical signals received at the input port 405 are propagated to an amplifier 410 such as an Erbium Doped Fiber Amplifier (EDFA) in which the optical signals are amplified. The amplified optical signals are then propagated to a splitter 415 that divides the broadcast video optical signals among diplexers 420 that are designed to forward optical signals to predetermined subscriber groups 200.

The transceiver node 120 can further comprise a bi-directional optical signal input/output port 425 that connects the transceiver node 120 to a second optical waveguide 170 that supports bi-directional data flow between the data service hub 110 and transceiver node 120. Downstream optical signals flow through the bi-directional optical signal input/output port 425 to an optical waveguide transceiver 430 that converts downstream optical signals into the electrical domain. The optical waveguide transceiver further converts upstream electrical signals into the optical domain. The optical waveguide transceiver 430 can comprise an optical/electrical converter and an electrical/optical converter. In another exemplary system, fiber 170 propagates signals downstream and fiber 180 propagates signals upstream.

Downstream and upstream electrical signals are communicated between the optical waveguide transceiver 430 and an optical tap routing device 435. The optical tap routing device 435 can manage the interface with the data service hub optical signals and can route or divide or apportion the data service hub signals according to individual tap multiplexers 440 that communicate optical signals with one or more optical taps 130 and ultimately one or more subscriber optical interfaces 140. It is noted that tap multiplexers 440 operate in the electrical domain to modulate laser transmitters in order to generate optical signals that are assigned to groups of subscribers coupled to one or more optical taps.

The optical tap routing device 435 is notified of available upstream data packets as they arrive, by each tap multiplexer 440. The optical tap routing device is connected to each tap multiplexer 440 to receive these upstream data packets. The optical tap routing device 435 relays the packets to the data service hub 110 via the optical waveguide transceiver 430. The optical tap routing device 435 can build a lookup table from these upstream data packets coming to it from all tap multiplexers 440 (or ports), by reading the source IP address of each packet, and associating it with the tap multiplexer 440 through which it came. This lookup table can then be used to route packets in the downstream path. As each packet comes in from the optical waveguide transceiver 430, the optical tap routing device 435 looks at the destination IP address (which is the same as the source IP address for the upstream packets). From the lookup table the optical tap routing device 435 can determine which port is connected to that IP address, so it sends the packet to that port. This can be described as a normal layer 3 router function as is understood by those skilled in the art.

The optical tap routing device 435 can assign multiple subscribers to a single port. More specifically, the optical tap routing device 435 can service groups of subscribers with corresponding respective, single ports. The optical taps 130 coupled to respective tap multiplexers 440 can supply downstream optical signals to pre-assigned groups of subscribers who receive the downstream optical signals with the subscriber optical interfaces 140.

In other words, the optical tap routing device 435 can determine which tap multiplexer 440 is to receive a downstream electrical signal, or identify which of a plurality of optical taps 130 propagated an upstream optical signal (that is converted to an electrical signal). The optical tap routing device 435 can format data and implement the protocol required to send and receive data from each individual subscriber connected to a respective optical tap 130. The optical tap routing device 435 can comprise a computer or a hardwired apparatus that defines a protocol for communications with groups of subscribers assigned to individual ports.

The single ports of the optical tap routing device are connected to respective tap multiplexers 440. With the optical tap routing device 435, the transceiver node 120 can adjust a subscriber's bandwidth on a subscription basis or on an as-needed or demand basis. The transceiver node 120 via the optical tap routing device 435 can offer data bandwidth to subscribers in pre-assigned increments. For example, the transceiver node 120 via the optical tap routing device 435 can offer a particular subscriber or groups of subscribers upstream and downstream bandwidth in units of 1, 2, 5, 10, 20, 50, 100, 200, and 450 Megabits per second (Mb/s). Those skilled in the art will appreciate that other subscriber bandwidth units are not beyond the scope of the present invention.

Electrical signals are communicated between the optical tap routing device 435 and respective tap multiplexers 440. The tap multiplexers 440 propagate optical signals to and from various groupings of subscribers. Each tap multiplexer 440 is connected to a respective optical transmitter 325. Each optical transmitter 325 can comprise one of a Fabry-Perot (F-P) laser, a distributed feedback laser (DFB), or a Vertical Cavity Surface Emitting Laser (VCSEL). However, other types of optical transmitters are possible and are not beyond the scope of the present invention. The optical transmitters produce the downstream optical signals that are propagated towards the subscriber optical interfaces 140.

Each tap multiplexer 440 is also coupled to an optical receiver 370. From the bi-directional splitter 360, respective optical receivers 370 can convert the upstream optical signals into the electrical domain. Each optical receiver 370 can comprise one or more photoreceptors or photodiodes that convert optical signals into electrical signals. Since the optical transmitters 325 and optical receivers 370 can comprise off-the-shelf hardware to generate and receive respective optical signals, the transceiver node 120 lends itself to efficient upgrading and maintenance to provide significantly increased data rates.

Each optical transmitter 325 and each optical receiver 370 are connected to a respective bidirectional splitter 360. Each bidirectional splitter 360 in turn is connected to a diplexer 420 which combines the unidirectional optical signals received from the splitter 415 with the downstream optical signals received from respective optical receivers 370. In this way, broadcast video services as well as data services can be supplied with a single optical waveguide such as a distribution optical waveguide 150 as illustrated in FIG. 2. In other words, optical signals can be coupled from each respective diplexer 420 to a combined signal input/output port 445 that is connected to a respective distribution optical waveguide 150.

Unlike the conventional art, the transceiver node 120 does not employ a conventional router. The components of the transceiver node 120 can be disposed within a compact electronic packaging volume. For example, the transceiver node 120 can be designed to hang on a strand or fit in a pedestal similar to conventional cable TV equipment that is placed within the "last mile," or subscriber-proximate portions of a network. It is noted that the term, "last mile," is a generic term often used to describe the last portion of an optical network that connects to subscribers.

Also because the optical tap routing device 435 is not a conventional router, it does not require active temperature controlling devices to maintain the operating environment at a specific temperature. In other words, the transceiver node 120 can operate in a temperature range between minus 40 degrees Celsius to 60 degrees Celsius in one exemplary embodiment.

While the transceiver node 120 does not comprise active temperature controlling devices that consume power to maintain temperature of the transceiver node 120 at a single temperature, the transceiver node 120 can comprise one or more passive temperature controlling devices 450 that do not consume power. The passive temperature controlling devices 450 can comprise one or more heat sinks or heat pipes that remove heat from the transceiver node 120. Those skilled in the art will appreciate that the present invention is not limited to these exemplary passive temperature controlling devices. Further, those skilled in the art will also appreciate the present invention is not limited to the exemplary operating temperature range disclosed. With appropriate passive temperature controlling devices 450, the operating temperature range of the transceiver node 120 can be reduced or expanded.

In addition to the transceiver node's 120 ability to withstand harsh outdoor environmental conditions, the transceiver node 120 can also provide high speed symmetrical data transmissions. In other words, the transceiver node 120 can propagate the same bit rates downstream and upstream to and from a network subscriber. This is yet another advantage over conventional networks, which typically cannot support symmetrical data transmissions as discussed in the background section above. Further, the transceiver node 120 can also serve a large number of subscribers while reducing the number of connections at both the data service hub 110 and the transceiver node 120 itself.

The transceiver node 120 also lends itself to efficient upgrading that can be performed entirely on the network side or data service hub 110 side. That is, upgrades to the hardware forming the transceiver node 120 can take place in locations between and within the data service hub 110 and the transceiver node 120. This means that the subscriber side of the network (from distribution optical waveguides 150 to the subscriber optical interfaces 140) can be left entirely in-tact during an upgrade to the transceiver node 120 or data service hub 110 or both.

Figure 4:
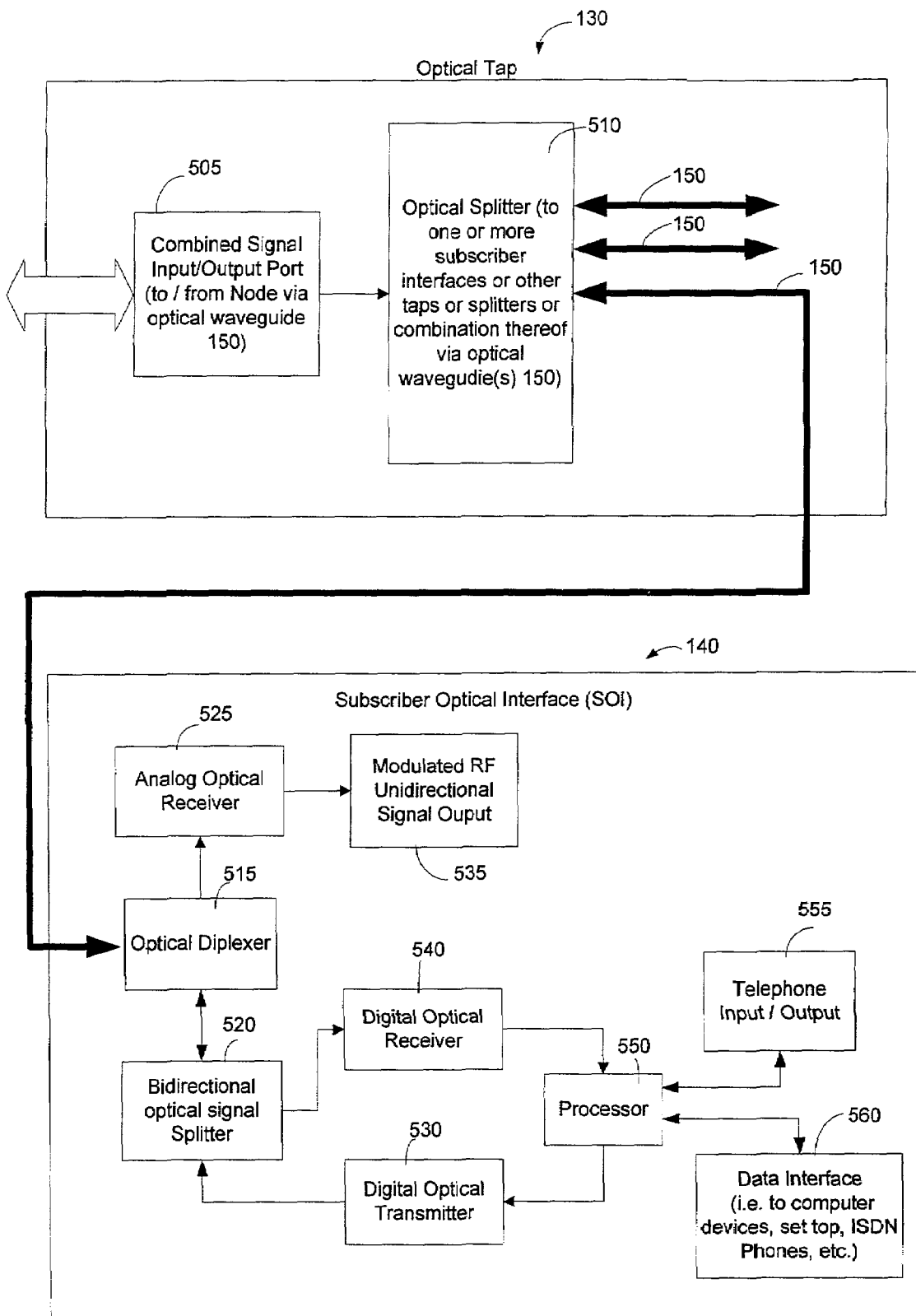
FIG. 4 is a block diagram illustrating an optical tap connected to a subscriber interface by a single optical waveguide according to one exemplary embodiment of the present invention.

Referring now to FIG. 4, this Figure is a functional block diagram illustrating an optical tap 130 connected to a subscriber optical interface 140 by a single optical waveguide 150 according to one exemplary embodiment of the present invention. The optical tap 130 can comprise a combined signal input/output port 505 that is connected to another distribution optical waveguide that is connected to a transceiver node 120. As noted above, the optical tap 130 can comprise an optical splitter 510 that can be a 4-way or 8-way optical splitter. Other optical taps having fewer or more than 4-way or 8-way splits are not beyond the scope of the present invention. The optical tap can divide downstream optical signals to serve respective subscriber optical interfaces 140. In the exemplary embodiment in which the optical tap 130 comprises a 4-way optical tap, such an optical tap can be of the pass-through type, meaning that a portion of the downstream optical signals is extracted or divided to serve a 4-way splitter contained therein, while the rest of the optical energy is passed further downstream to other distribution optical waveguides 150.

The optical tap 130 is an efficient coupler that can communicate optical signals between the transceiver node 120 and a respective subscriber optical interface 140. Optical taps 130 can be cascaded, or they can be connected in a star architecture from the transceiver node 120. As discussed above, the optical tap 130 can also route signals to other optical taps that are downstream relative to a respective optical tap 130.

Figure 11:
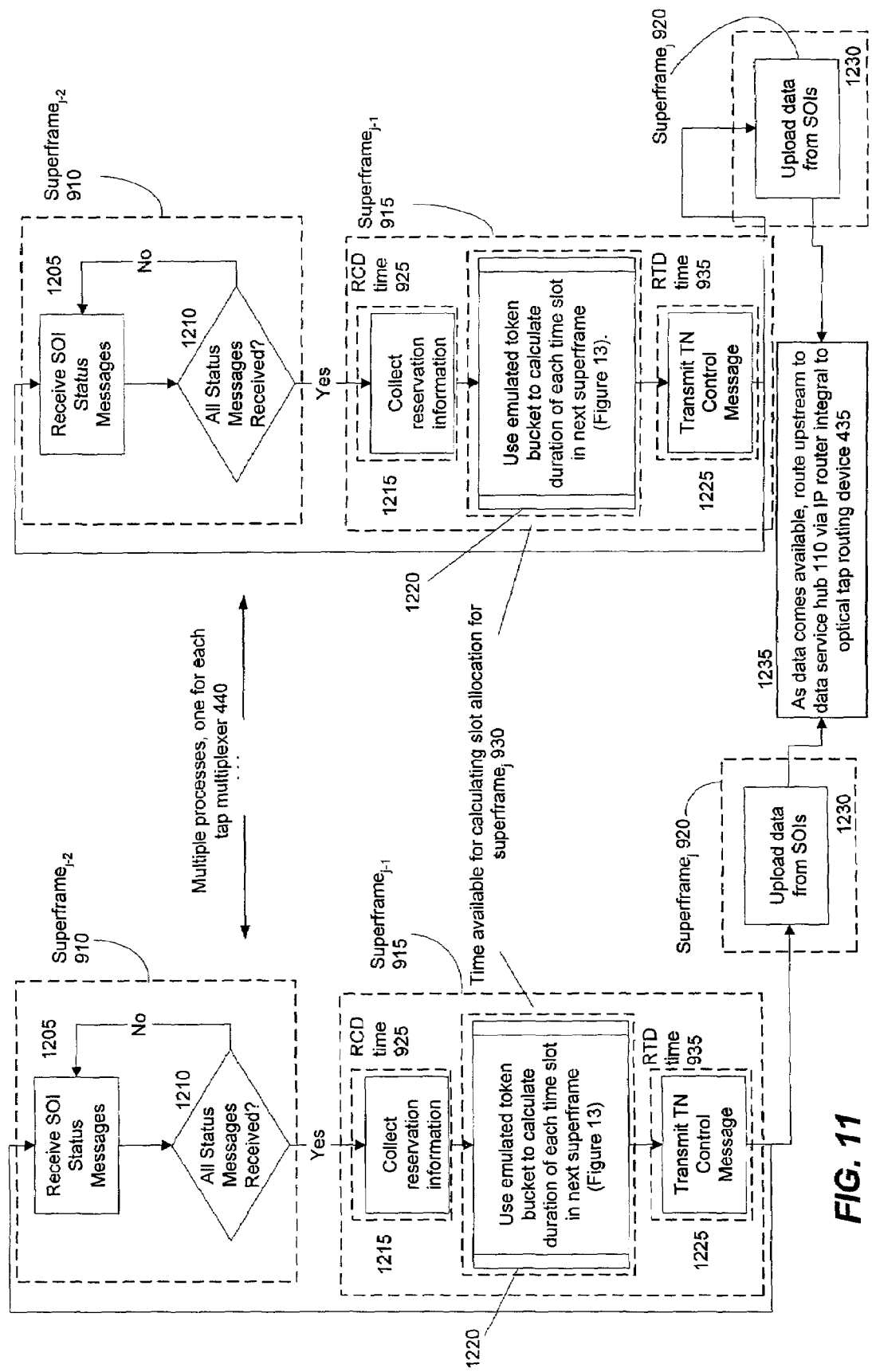
FIG. 11 is a logic flow diagram illustrating one exemplary embodiment of the high level steps that the invention performs in managing upstream data.

The optical tap 130 can also connect to a limited or small number of optical waveguides so that high concentrations of optical waveguides are not present at any particular transceiver node 120. In other words, in one exemplary embodiment, the optical tap can connect to a limited number of optical waveguides 150 at a point remote from the transceiver node 120 so that high concentrations of optical waveguides 150 at a transceiver node can be avoided. However, those skilled in the art will appreciate that the optical tap 130 can be incorporated within the transceiver node 120 as will be discussed in further detail below with respect to another exemplary embodiment of the transceiver node 120 as illustrated in FIG. 11.

The subscriber optical interface 140 functions to convert downstream optical signals received from the optical tap 130 into the electrical domain that can be processed with appropriate communication devices. The subscriber optical interface 140 further functions to convert upstream electrical signals into upstream optical signals that can be propagated along a distribution optical waveguide 150 to the optical tap 130. The subscriber optical interface 140 can comprise an optical diplexer 515 that divides the downstream optical signals received from the distribution optical waveguide 150 between a bidirectional optical signal splitter 520 and an analog optical receiver 525. The optical diplexer 515 can receive upstream optical signals generated by a digital optical transmitter 530. The digital optical transmitter 530 converts electrical binary/digital signals to optical form so that the optical signals can be transmitted back to the data service hub 110. Conversely, the digital optical receiver 540 converts optical signals into electrical binary/digital signals so that the electrical signals can be handled by processor 550.

The present invention can propagate the optical signals at various wavelengths. However, the wavelength regions discussed are practical and are only illustrative of exemplary embodiments. Those skilled in the art will appreciate that other wavelengths that are either higher or lower than or between the 1310 and 1550 nm wavelength regions are not beyond the scope of the present invention.

The analog optical receiver 525 can convert the downstream broadcast optical video signals into modulated RF television signals that are propagated out of the modulated RF unidirectional signal output 535. The modulated RF unidirectional signal output 535 can feed to RF receivers such as television sets (not shown) or radios (not shown). The analog optical receiver 525 can process analog modulated RF transmission as well as digitally modulated RF transmissions for digital TV applications.

The bi-directional optical signal splitter 520 can propagate combined optical signals in their respective directions. That is, downstream optical signals entering the bi-directional optical splitter 520 from the optical the optical diplexer 515, are propagated to the digital optical receiver 540. Upstream optical signals entering it from the digital optical transmitter 530 are sent to optical diplexer 515 and then to optical tap 130. The bi-directional optical signal splitter 520 is connected to a digital optical receiver 540 that converts downstream data optical signals into the electrical domain. Meanwhile the bi-directional optical signal splitter 520 is also connected to a digital optical transmitter 530 that converts upstream electrical signals into the optical domain.

The digital optical receiver 540 can comprise one or more photoreceptors or photodiodes that convert optical signals into the electrical domain. The digital optical transmitter can comprise one or more lasers such as the Fabry-Perot (F-P) Lasers, distributed feedback lasers, and Vertical Cavity Surface Emitting Lasers (VCSELs).

The digital optical receiver 540 and digital optical transmitter 530 are connected to a processor 550 that selects data intended for the instant subscriber optical interface 140 based upon an embedded address. The data handled by the processor 550 can comprise one or more of telephony and data services such as an Internet service. The processor 550 is connected to a telephone input/output 555 that can comprise an analog interface. The processor 550 is also connected to a data interface 560 that can provide a link to computer devices, set top boxes, ISDN phones, and other like devices. Alternatively, the data interface 560 can also provide a link to a Voice over Internet Protocol (VOIP) telephone or Ethernet telephone. The data interface 560 can comprise one of Ethernet's (10BaseT, 100BaseT, Gigabit) interface, HPNA interface, a universal serial bus (USB) an IEEE1394 interface, an ADSL interface, and other like interfaces.

Figure 5:
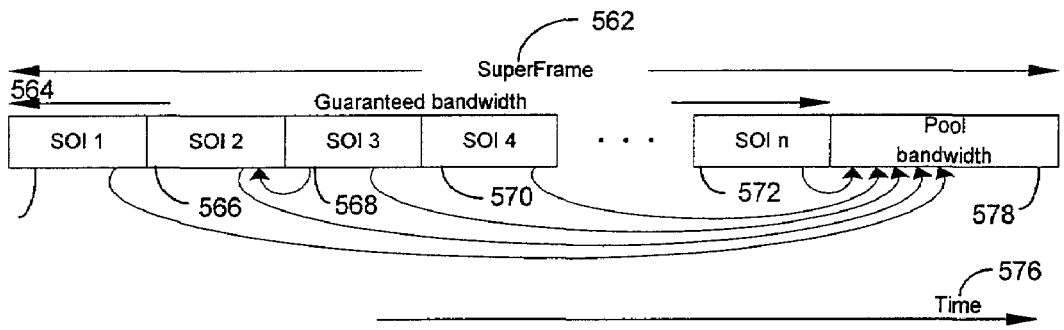
FIG. 5 is a block diagram illustrating guaranteed upstream bandwidth and pooled upstream bandwidth during a superframe according to a first exemplary embodiment of the present invention.

Referring now to FIG. 5, this figure is a block diagram illustrating guaranteed upstream bandwidth and pooled upstream bandwidth during a single superframe 562 according to an exemplary embodiment of the present invention. A superframe 562 typically comprises a duration of time over which an entire sequence of events repeats. In one exemplary embodiment, a superframe may comprise 8 milliseconds in duration. This means, that every 8 milliseconds, a transceiver node 120 can cycle through all the subscribers 140 on a given tap multiplexer 440, giving each subscriber 140 a turn or an opportunity to transmit data packets. In one exemplary embodiment, sixteen subscribers 140 can be serviced on a single upstream channel. However, those skilled in the art will appreciate that fewer or greater number of subscribers 140 can be added to channels without departing from the scope and spirit of the present invention.

Adjacent to frame 500 is a horizontal axis 576 that denotes time. In FIG. 5, each time slot represents a period of time in which a subscriber optical interface (SOI) can transmit data packets in an upstream direction. Time slots 564, 566, 568, 570 and 572 form the guaranteed bandwidth 574 for superframe 562. Bandwidth, as described in FIG. 5, comprises the number of bits of data that can be transmitted per unit of time. This is typically a function of the data rate, and also the time allowed. Bandwidth is often referred to in terms of a certain number of megabits per second (million bits per second, MBps).

As illustrated in FIG. 5, each subscriber optical interface 140 has an assigned time slot 564, 566, 568, 570, and 572 in which to transmit information in the upstream direction over the optical network 100. For example, a first subscriber optical interface assigned to a first time slot 564 may first transmit while a second subscriber optical interface may transmit during a second time slot 566 after the duration of time slot 564. After each subscriber optical interface has transmitted during its assigned time slot, each subscriber optical interface may further transmit during a pool bandwidth 578. Each subscriber optical interface 140 typically must request bandwidth from the pool bandwidth 578 before bandwidth can be granted it by the protocol of the present invention that is executed primarily in the transceiver node 120.

Any subscriber optical interface 140 may use the pool bandwidth 578 if the pool bandwidth 578 has not been previously taken by another subscriber optical interface. Typically, a subscriber optical interface 140 can use guaranteed bandwidth first, and then if additional data is desired to be transmitted beyond that of the guaranteed bandwidth, the subscriber optical interface 140 can request for additional time that may be allocated from the pool bandwidth 578.

Figure 6:
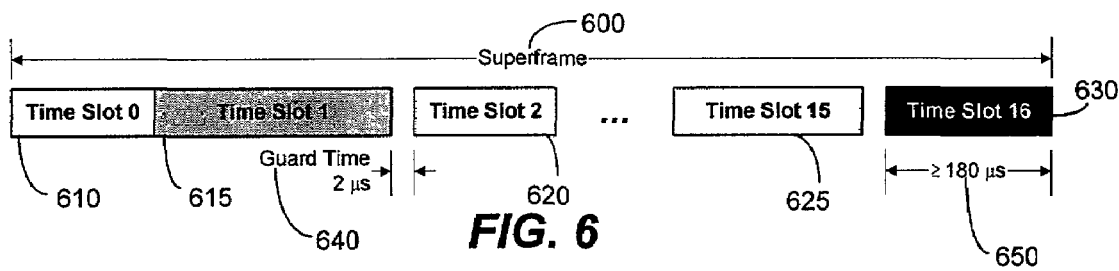
FIG. 6 is a block diagram illustrating another superframe comprising variable length time slots for subscriber optical interfaces of a predetermined group of sixteen subscribers according to a second exemplary embodiment of the present invention.

Referring now to FIG. 6, this figure illustrates a second exemplary and preferred embodiment of how upstream bandwidth is divided into individual time slots within a single superframe. A superframe 600 typically comprises a duration of time over which an entire sequence of events repeats. In one exemplary embodiment, a superframe may comprise eight (8) milliseconds in duration. This means that every eight (8) milliseconds a transceiver node can cycle through all the subscribers on a given channel, giving each subscriber a turn or opportunity to transmit data packets. In one exemplary embodiment, sixteen subscribers can be serviced on a single upstream channel. However, those skilled in the art will appreciate that fewer or greater number of subscribers can be added to channels without departing from the scope and spirit of the present invention.

FIG. 6 represents time as increasing from left to right. Each time slot represents a period of time in which a specific subscriber optical interface 140 (SOI) can transmit data packets in an upstream direction. For example, a first subscriber optical interface assigned to time slot 0 may transmit during that time slot, while a second subscriber optical interface may transmit during a second time slot after the duration of the first time slot.

The duration of each individual time slot is controlled by the transceiver node 120. The transceiver node controls each time slot so as to provide the guaranteed bandwidth to each subscriber, as well as any pooled bandwidth made available to that subscriber for the duration of the current superframe. The sum of all time slots usually must be less than or equal to the duration of the superframe. If the entire superframe is not needed to transmit the available data, then the time slots are "bunched up" near the beginning of the superframe, and there will be time near the end of the superframe in which nothing (no data) is transmitted.

The final time slot in FIG. 6 is a special time slot reserved for unknown subscriber optical interfaces to transmit, allowing the transceiver node to discover their presence. Because the transceiver node and any unknown subscriber optical interface will not have established ranging information and other parameters that may influence the relative timing of the two systems, this special discovery time slot must be of sufficient duration to accommodate a wide range of relative timing offsets. An exemplary embodiment of the present invention may establish a minimum discovery slot time of 180 microseconds.

The discovery time slot need not be present in every superframe. A typical embodiment of the present invention would have the transceiver node schedule a discovery time slot approximately once every second, or once every 125 superframes.

FIG. 6 further shows that a guard band or time may be provided between adjacent time slots. The guard band provides sufficient time for the laser of the first subscriber optical interface 140 to reduce its output power to zero and the laser of the second subscriber optical interface 140 to reach full operating power without interfering with the first one. It also includes time for the tap multiplexer 440 to lock to (or synchronize with) the clock of the starting subscriber optical interface 140. A guard time of 2 μs is shown by way of example. The exact duration of the guard band will depend on the transition times of the digital optical transmitters 530 and the clock acquisition time of the tap multiplexer 440.

The guard time typically exists, but it may be made smaller in the case of two laser optical receivers being shared at the transceiver node. In this case, if the SOI 140 ending its time slot and the SOI 140 starting its time slot, feed different optical receivers (i.e., when a switch must alternate positions to receive the starting SOI 140), then the starting SOI's optical transmitter can be turned on before the ending SOI's optical transmitter is turned off, and the ending SOI's transmitter can be turned off after the switch is activated. Such an operation could save some guard time. However, some guard time may exist during which the starting SOI 140 is transmitting a "run-in sequence" required to lock (or synchronize with) the clock in the tap multiplexer to the clock in the transmitter. This is a common requirement as understood by those skilled in the art.

Figure 7:
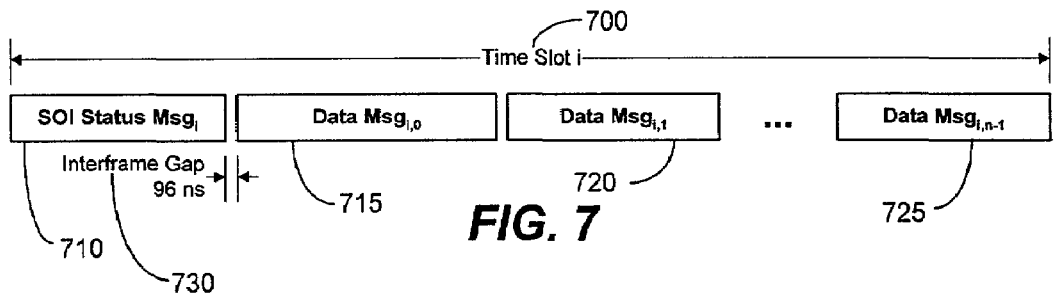
FIG. 7 is a block diagram illustrating a group of data packets transmitted during a single time slot according to the second exemplary embodiment of the present invention.
Figure 8:
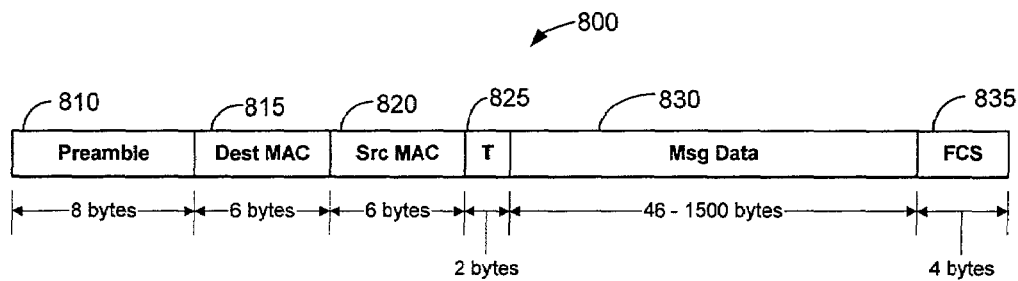
FIG. 8 is a block diagram illustrating exemplary contents and field sizes of a data packet according to the second exemplary embodiment of the present invention.

FIG. 7 illustrates how each individual subscriber optical interface 140 may make use of its assigned time slot. The figure shows that the subscriber optical interface 140 first transmits an SOI status message and then follows that message with zero or more data messages. The number of data messages is limited only by the duration of the assigned time slot; transmission of the entire data message must conclude before the time slot ends. Each message (both status and data) is formatted as a standard Ethernet frame (as illustrated in FIG. 8), and the standard Ethernet interframe gap (such as 96 nanoseconds at 1 Gbit/s) separates individual frames. The interframe gap is understood by those skilled in the art as helping the receiver identify the start of an Ethernet message.

TABLE 1

Packet Fields

| Field Description | Length in Bits | Length in Bytes | Offset in Bytes |
|---|---|---|---|
| Destination address (fixed value, not used) | 48 | 6 | 0 |
| Source address (fixed value, not used) | 48 | 6 | 6 |
| Type Field, must match [] Transceiver Node Type Field | 16 | 2 | 12 |
| Reserved (not used) | 16 | 2 | 14 |
| Reserved (not used) | 16 | 2 | 16 |
| Reserved (not used) | 16 | 2 | 18 |
| TN Transmission time stamp (T2), ms, 4 bits used | 16 | 2 | 20 |
| TN Transmission time stamp (T2), ls, units = 8 ns | 16 | 2 | 22 |
| Status word | | | |
| Reserved | 19 | | |
| Subscriber optical interface status | 5 | | |
| Subscriber optical interface id | 8 | 4 | 24 |
| Lo priority buffered data count, units = 128 bytes | 16 | 2 | 28 |
| Hi priority buffered data count, units = 128 bytes | 16 | 2 | 30 |
| Software info 0 | 16 | 2 | 32 |
| Software info 1 | 16 | 2 | 34 |
| Software info 2 | 16 | 2 | 36 |
| Software info 3 | 16 | 2 | 38 |
| Reserved (not used) | 8*20 | 20 | 40 |
| FCS | 32 | 4 | 60 |

The SOI status message is also formatted as a standard Ethernet frame. Its payload can comprise a count of the number of bytes stored in the subscriber optical interface's upstream transmission queues at the beginning of the timeslot. This information will be used to compute how much time that SOI gets to transmit in a later superframe, as shown below. Table 1 shows an exemplary SOI status message.

Note that one time slot, from one subscriber optical interface (SOI) 140, may take up the majority of the superframe, or it may take up only a minor portion of the superframe. If only one SOI 140 has significant data to transmit, then it will be assigned nearly the entire superframe. In the preferred embodiment, each SOI has a minimum time during which it transmits its SOI status message 710. By way of example, the minimum time may be that required to transmit 256 kb of data is 256 μs. An exception would be time slot 16,650, which may be shorter because only a small message must be transmitted. These are examples only, and the invention may use longer or shorter minimum time slots.

Referring now to FIG. 8, the contents of an exemplary timeslot 800 are illustrated. Those skilled in the art will recognize this as a standard Ethernet packet, though the invention is not limited to Ethernet packets. Exemplary timeslot 800 may comprise a preamble 810 that may have an exemplary size of eight bytes. The timeslot 800 may further comprise a destination media access control message 815 that may comprise an exemplary length of six bytes. The timeslot 800 may further comprise a source media access control message 820 that also comprises an exemplary size of six bytes. Adjacent to the source media access control message 820 can be a type/length identifier, T 825, which is understood by those skilled in the art.

Adjacent to the T 825 can be message data 830 comprising an exemplary length between forty-six and 1,500 bytes. Adjacent to the message data 830 is an FCS 835. The FCS is a frame check sequence, a standard feature of Ethernet used to validate the integrity of the data in the packet. This is understood by those skilled in the art. The FCS message 840 can comprise an exemplary length of four bytes. Those skilled in the art understand that the present invention is not limited to the exemplary lengths illustrated. That is, smaller or larger data messages are not beyond the scope of the present invention.

Figure 9:
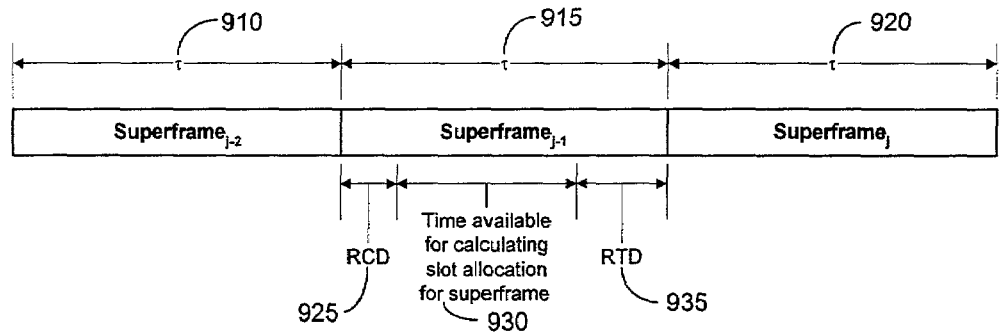
FIG. 9 is a block diagram illustrating multiple superframes according to the second exemplary embodiment of the present invention.

Referring to FIG. 9, this Figure illustrates a plurality of exemplary superframes 910, 915 and 920 that can be processed by a transceiver node 120 according to the present invention. FIG. 9 shows how the subscriber optical interfaces 140 notify the transceiver node 120 of their respective needs for bandwidth, and how the transceiver node 120 authorizes the subscriber optical interfaces 140 to transmit that data. Within the transceiver node 120, optical tap routing device 435, working with the plurality of tap multiplexers 440, performs the intelligent operations required to manage traffic. During superframe$_{j-2}$ 910 the subscriber optical interfaces can make their resource reservation requests.

After the completion of superframe$_{j-2}$ 910 and a Reservation Collection Delay (RCD) 925, the complete set of reservation requests is available to the optical tap routing device 435. The RCD 925 includes the one-way propagation delay and other and other delays within the transceiver node 120. The optical tap routing device 435 usually must complete its calculation of timeslot allocations for superframe$_j$ 920 before the beginning of that superframe, with enough time remaining to communicate the allocations to all of the subscriber optical interfaces 140.

The Reservation Transmission Delay (RTD) 935 typically comprises the required time remaining to communicate the allocations to all of the subscriber optical interfaces 140. It can include the setup time in the optical tap routing device 435, worst-case transmission delay for the downstream message in progress (which message must complete before the setup data can be transmitted), one-way propagation delay, and the reception and interpretation delay in the subscriber optical interface 140.

Between the RCD 925 and the RTD 935 is the actual processing time 930 available for calculating slot allocations for superframe, 920. During this time, the optical tap routing device 435 usually must make all the computations required to apportion data transmission during superframe$_j$ 930. Note that the RCD 925, the calculation time 930 and the RTD 935 typically take place during superframe$_{j-1}$ 915. During superframe$_{j-1}$ 915 data is also being transmitted upstream, based on requests made in the superframe that preceded superframe$_{j-2}$ 910. Had this superframe been shown, it would have appeared in FIG. 9 to the left of superframe$_{j-2}$ 910.

Thus, the process illustrated in FIG. 9 may be thought of as a continuous, or sliding, process, whereby during each frame data is transmitted, along with requests for transmission slots that will be granted (or not, depending on time available) to superframes in the future. At least one superframe 915 usually must intervene between the time of the requests (during superframe 910) and the time of the grant (acted on during superframe 920), to allow the optical tap routing device 435 time to gather all requests and determine how to dispense with them, and then to send appropriate instructions to each subscriber optical interface 140. However, during the intervening superframe 915, upstream data is being transmitted, based on an earlier cycle of request, decision and grant.

Figure 10:
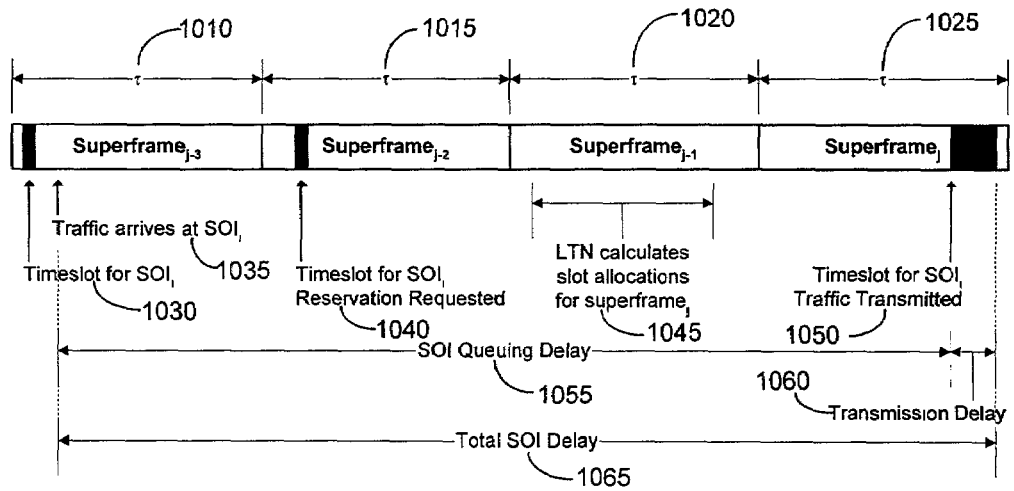
FIG. 10 is a block diagram illustrating multiple superframes and possible queuing and transmission delays according to the second exemplary embodiment of the present invention.

Referring now to FIG. 10, this Figure illustrates a plurality of superframes 1010, 1015, 1020 and 1025 that have an exemplary length of $\tau$ (tau). This figure is included to illustrate the maximum delay in transmitting a packet, that results from the method used to determine what messages can be sent. It illustrates an exemplars maximum delay that a packet will encounter from the time it enters the subscriber optical interface 140, to the time it arrives at the optical tap routing device 435. From the optical tap routing device 435, the packet is handled according to the standard gigabit Ethernet protocol, defined by 802.3 z, in the exemplary system. However, the invention is not limited to handling the packet using Ethernet protocol from the optical tap routing device 435 upstream into standard routers. Other known protocols such as SONET may be used at this stage of processing.

As a consequence of the procedure described above with reference to FIG. 9, there is usually a minimum delay between the time when a subscriber optical interface 140 recognizes the need for resources and the time those resources are available. As FIG. 10 illustrates, the worst-case value for this delay is approximately four times the length of the superframe, such as eight (8) ms in the exemplary system. Thus, in the exemplary system, a packet may be delayed by nearly 32 ms. This worst-case delay occurs when the situation illustrated in FIG. 10 occurs.

In this example, traffic 1035 arrives at the subscriber optical interface 140 just after that subscriber optical interface 140 has transmitted its data for superframe$_{j-3}$ 1010. The subscriber optical interface 140 cannot request a timeslot for the traffic 1035 to be transmitted, until its timeslot 1040 in superframe$_{j-2}$ 1015.

As shown above in FIG. 9, the packet is then delayed until superframe$_j$ 1025, when it is transmitted. Normally the subscriber optical interface 140 with this traffic 1035 will transmit in a similar point during each superframe, but it is possible that another subscriber optical interface 140 will have requested and been granted a very long timeslot earlier in superframe$_j$ 1025. In this case, the subject traffic 1035 will not be transmitted until near the end of superframe$_j$ 1025. Inspection of FIG. 10 will show that the total delay to traffic 1035 is slightly less than four superframes, represented by the queuing delay 1055. The total delay, from the time the traffic 1035 arrives at the subscriber optical interface, to the time when it has been completely transmitted to the transceiver node 120 is usually the total SOI delay 1065.

As described under FIG. 9, the process illustrated in FIG. 10 is a "sliding" process, in which the same event occurs every superframe. Thus, while the subject traffic 1035 is not being transmitted during superframes 1015 and 1020, other data is being handled during these times. Those skilled in the art will appreciate that the example of FIG. 10 is a worst-case delay, and that average delays is lower.

Referring now to FIG. 11, this figure illustrates an exemplary method for a handling upstream communications originating from subscribers of an optical network that are transmitted to the data service hub 110 of the optical network. Basically, FIG. 11 provides an overview of the processing performed by transceiver node 120, and specifically, the optical tap routing device 435.

The description of the flow charts that follows is represented largely in terms of processes and symbolic representations of operations by conventional computer components, including a processing unit (a processor), memory storage devices, connected display devices, and input devices. Furthermore, these processes and operations may utilize conventional computer components in a heterogeneous distributed computing environment, including remote file servers, computer servers, and memory storage devices. Each of these conventional distributed computing components can be accessible by the processor via a communication network.

The processes and operations performed below may include the manipulation of signals by a processor and the maintenance of these signals within data structures resident in one or more memory storage devices. For the purposes of this discussion, a process is generally conceived to be a sequence of computer-executed steps leading to a desired result. These steps usually require physical manipulations of physical quantities. Usually, though not necessarily, these quantities take the form of electrical, magnetic, or optical signals capable of being stored, transferred, combined, compared, or otherwise manipulated. It is convention for those skilled in the art to refer to representations of these signals as bits, bytes, words, information, elements, symbols, characters, numbers, points, data, entries, objects, images, files, or the like. It should be kept in mind, however, that these and similar terms are associated with appropriate physical quantities for computer operations, and that these terms are merely conventional labels applied to physical quantities that exist within and during operation of the computer.

It should also be understood that manipulations within the computer are often referred to in terms such as creating, adding, calculating, comparing, moving, receiving, determining, identifying, populating, loading, executing, etc. that are often associated with manual operations performed by a human operator. The operations described herein can be machine operations performed in conjunction with various input provided by a human operator or user that interacts with the computer.

In addition, it should be understood that the programs, processes, methods, etc. described herein are not related or limited to any particular computer or apparatus. Rather, various types of general purpose machines may be used with the following process in accordance with the teachings described herein.

The logic flow described in FIG. 11–16 can be the core logic or top level processing and can be executed repeatedly. The logic flow diagram illustrated in FIGS. 11–16 show a process that can occur after initialization of the software or hardware components or both illustrated in FIGS. 1–5.

For example, in an object-oriented programming environment, software components or software objects or hardware that could be used to perform the steps illustrated in FIG. 11–16 can be initialized or created. Therefore, one of ordinary skill in the art recognizes that several steps pertaining to initialization of software objects or hardware described in FIGS. 1 through 5 may not be illustrated.

The present invention may comprise a computer program or hardware or a combination thereof which embodies the functions described herein and illustrated in the appended flow charts. However, it should be apparent that there could be many different ways of implementing the invention in computer programming or hardware design, and the invention should not be construed as limited to any one set of computer program instructions. Further, a skilled programmer would be able to write such a computer program or identify the appropriate hardware circuits to implement the disclosed invention without difficulty based on the flow charts and associated description in the application text, for example. Therefore, disclosure of a particular set of program code instructions or detailed hardware devices is not considered necessary for an adequate understanding of how to make and use the invention. The inventive functionality of the claimed computer implemented process will be explained in more detail in the following description in conjunction with the remaining Figures illustrating the process flow.

Certain steps in the processes or process flow described below must naturally precede others for the present invention to function as described. However, the present invention is not limited to the order of the steps described if such order or sequence does not alter the functionality of the present invention. That is, it is recognized that some steps may be performed before or after other steps without departing from the scope and spirit of the present invention.

Briefly referring back to FIG. 2, one transceiver node 120 can service a plurality of subscriber optical interfaces 140, by way of optical taps 130. FIG. 3 illustrates more detail of the transceiver node 120, wherein a single optical tap routing device 435 works with a plurality of tap multiplexers 440, with each tap multiplexer 440 connected to a plurality of subscriber optical interfaces 140. Each tap multiplexer 440 can execute the process described in FIG. 11. While two like processes are illustrated in FIG. 11, there may be six or more such processes operating simultaneously in a parallel manner. Only one of the plurality of processes will be described in detail below with reference to FIG. 11.

Step 1205 is the first step in the method for processing upstream data packets as illustrated in FIG. 11. In step 1205, during each superframe, each SOI 140 sends a status message indicating how much data that SOI 140 has in its buffer to transmit. This amount of data is referred to as instantaneous queue size. After transmitting its status message, the SOI sends as much data was authorized in that superframe (not shown on this flow chart). For example, during a superframe, typically each SOI transmits once and only once in one exemplary embodiment. During that transmission time, the SOI typically first transmits its status message, followed by its traffic for the Tmin (e.g., phone calls or DS1 channels), then transmits all other packets for which it was authorized.

In step 1205, the first SOI 140 sends its status message followed by its data. In step 1210, the tap multiplexer 440 determines if there are other SOIs 140 that have not yet sent their status message. If all status messages have not been received during the current superframe, then the process loops back to step 1205 to wait for a status message from another SOI 140. In other words, the tap multiplexer 440 typically can't receive the next status message until the next SOI transmits, so it may wait. Note that this process occurs during superframe$_{j-2}$ 910 as illustrated in FIG. 9.

After all messages have been received, the process proceeds to step 1215, during which the transceiver node processes reservation information such as the instantaneous queue size reported by all SOIs in their status messages. The reservation information tells the tap multiplexer 440 how much data the particular SOI 140 has in its queue to transmit. This information will be used to determine the time allocation for that SOI during superframe. This occurs during the RCD time 925 as illustrated in FIG. 9.

After all the needed data is accumulated, in routine 1220, much of the upstream data management can be performed. Routine 1220 can comprise an emulated token bucket algorithm which can control the transmission of upstream data for multiple subscriber optical interfaces 140. While this routine 1220 has been characterized as a token bucket algorithm, routine 1220 can perform a little differently than a conventional token bucket as will be described in further detail below. Those skilled in the art are familiar with token bucket algorithms. One reference which describes such bucket algorithms is the following publication: "Policing and Shaping Overview," published by Cisco Systems, Inc., pages QC 87–QC 98. Another exemplary publication describing token bucket algorithms is the following white paper: "Cisco IOS(TM) Software Quality of Service Solutions," published by Cisco Systems, Inc., copyright 1998. The contents of both these reference are incorporated fully herein by reference.

At the end of Routine 1220, it has been determined when and for how long each SOI 140 will transmit during the next superframe. This information is transmitted downstream to the SOIs 140 during step 1225, which occurs during the RTD time 935 of FIG. 9.

In step 1230, during superframe$_j$ 920 of FIG. 9, the data that was assigned timeslots in routine 1220 is transmitted upstream, in step 1230. As data becomes available from the parallel processing of chains or groups of steps 1205 through 1230 performed by individual tap multiplexers 440, the information is passed upstream to data service hub 110, in step 1235.

Figure 12:
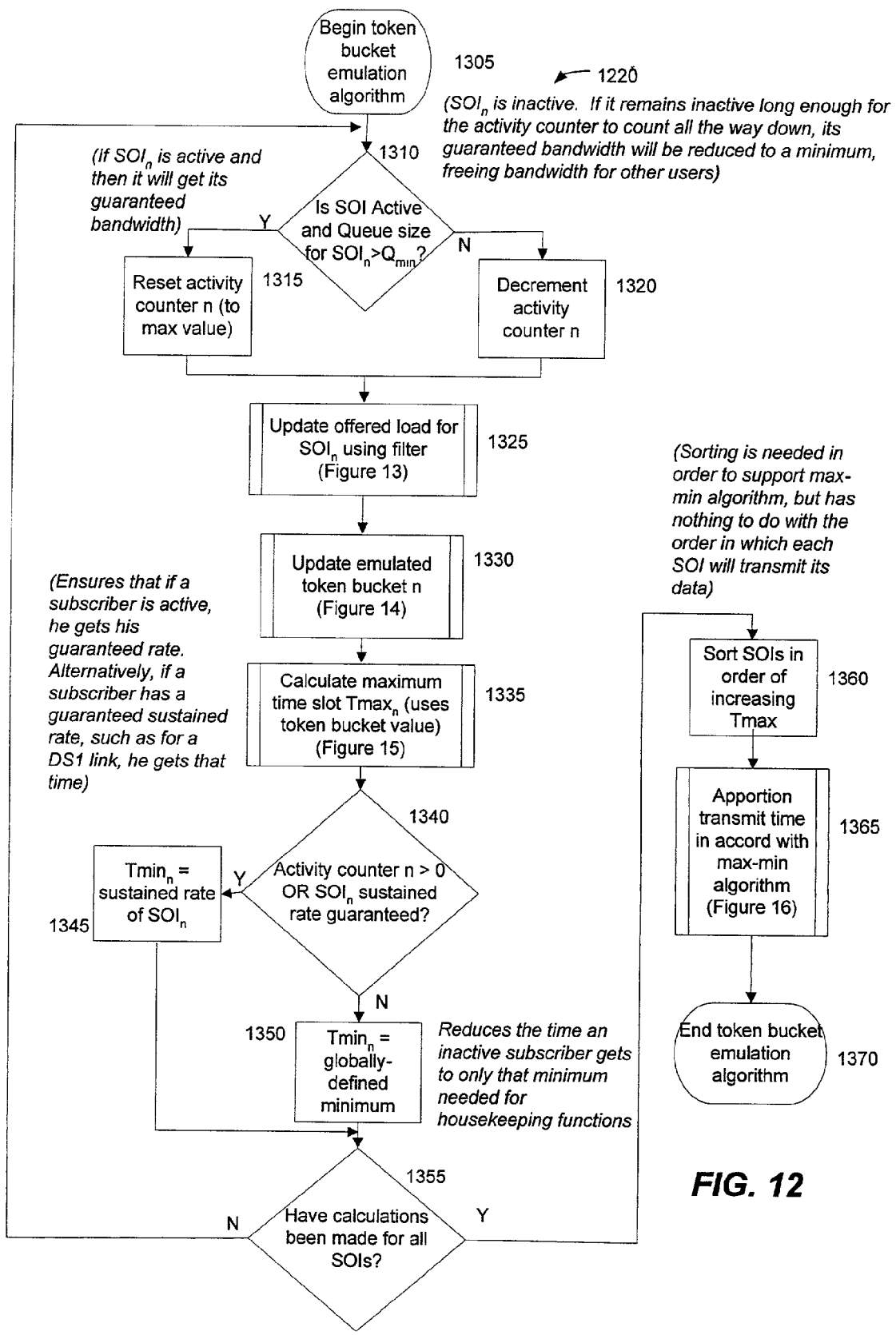
FIG. 12 is a logic flow diagram illustrating an exemplary token bucket emulation algorithm.

Referring now to FIG. 12, routine 1220 will now be explained in more detail. Processing for routine 1220 begins at step 1305. The subsequent steps are performed individually for each SOI 140 connected to a respective tap multiplexer 440. In step 1310, the queue size, that is, the amount of data that an individual SOIn 140$n$ has to transmit, is evaluated. (The suffix n with reference to a subscriber optical interface 140 is used to indicate any one of a plurality of SOIs 140.)

In decision step 1310 it is determined whether the instant SOI$_n$ 140$n$ is active at the moment. If the inquiry to decision step 1310 is positive then it will be given its due allocation of time in which to transmit data upstream. However, if the inquiry to decision step 1310 is negative where the SOI 140 remains inactive for some consecutive number of superframes, then the bandwidth of the instant SOI 140 is taken away, and may be given to an active SOI 140 which can use that bandwidth. In the invention, some minimum bandwidth is usually reserved for each SOI 140 in order that certain housekeeping functions can be performed. These housekeeping functions can comprise monitoring the internal performance of the SOI 140 and learning quickly when an SOI 140 does have some data to transmit. The determination of whether or not the instant $SOI_n$ 140 is active is made in the next few steps.

An activity counter for each SOI 140 is also usually provided, and is initially set to some maximum value determined by the network service provider or manufacturer of an SOI 140. If, by way of example, the maximum value is set equal to five then if the SOI 140 does not have any traffic to send for five consecutive superframes, it will be considered inactive.

In step 1310, it is also determined if the queue size of the instant $SOI_n$ exceeds a minimum threshold that corresponds to its housekeeping traffic. If the inquiry to decision step 1310 is negative, then the "No" path is followed to step 1320 in which the activity counter is decremented. If the activity counter reaches zero, then bandwidth will be removed from the instant SOI being evaluated and can be assigned to other SOIs 140. If the inquiry to decision step 1310 is positive, where there is data in excess of the minimum queue size Qmin, then the "yes" branch is followed to step 1315 in which the activity counter is reset to its maximum value.

In routine 1325, the offered load (which is typically equal to the queue size less than what is to be transmitted during the current superframe$_{j-1}$) is filtered in the time domain. The purpose of this filter function in routine 1325 is to keep the system from over-reacting to instantaneous increases or decreases in load size. The problems associated with over-reaction are understood by those skilled in the art. Further details of routine 1325 will be described below with respect to FIG. 13.

Next, in routine 1330, the number of tokens in the emulated token bucket algorithm for $SOI_n$ 140 is updated. Further details of routine 1330 will be described below with respect to FIG. 14. This updated number of tokens will be used in routine 1335, which determines the maximum length of the time slot Tmaxn that $SOI_n$140 will be allowed to transmit data. Further details of routine 1335 will be described below with respect to FIG. 15.

A minimum time slot, Tminn, comprising the minimum time that the SOIn 140 will be allowed to transmit is determined in decision step 1340. If the inquiry to decision step 1340 is negative where the activity counter described above has reached zero, the "No" path is followed to step 1350 in which it is assumed that $SOI_n$ 140 is inactive. The $SOI_n$ 140 is then assigned the minimum time slot, which comprises a size just large enough to accommodate housekeeping functions.

If the activity counter of the $SOI_n$ 140 is greater than zero, or if the $SOI_n$140 has been granted some sustained rate that is constantly available regardless of whether it is used (such as if, a DS1 circuit was provided), then the "yes" branch is followed to step 1345. Those skilled in the art understand that DS1 circuits are often used by businesses to carry PBX (local telephone switching) and other data. Also, it may be that the user has some data that occurs sporadically, but which must be handled with minimum delay when the data is transmitted. A telephone call might fall in this category.

As noted previously if either of these two conditions exist, then the "Yes" path is followed to step 1345, in which Tminn is assigned an appropriate value for that SOI 140. The appropriate value is typically determined when service is established or modified according to subscription or level of service requested by the subscriber.

In decision step 1355, it is determined whether all SOIs 140 have been accounted for or processed during the instant superframe. If the inquiry to decision step 1355 is negative, the "No" branch is followed back to step 1310 to process data for the next SOI 140. If all SOIs 140 have been processed, then the "Yes" branch is followed to step 1360, where the SOIs 140 are ordered or sorted by increasing Tmax. This sort determines the order that the SOIs will be considered in subsequent calculations, but it does not effect the order in which they transmit.

After the SOIs 140 are ordered in step 1360, the actual transmit times are computed in routine 1365, which will be explained in more detail below in conjunction with FIG. 16. After the transmit times are computed in routine 1365, the token bucket emulation ends and the process returns to step 1225.

Referring now to FIG. 13, routine 1325 describing the updating of the offered load, will now be described. FIG. 13 illustrates a filtering function that reduces variation in the offered load, or queue size. This filtering is understood by those skilled in the art, to improve the performance of a communications system by preventing it from over-reacting to a sudden increase or decrease in traffic. The filter can use a large fraction of the previous load (which itself is the output of this routine) and a small fraction of the load that exists for the current superframe being evaluated, to determine an average load.

In step 1410, the previous value of the average load is multiplied by a fraction f. Many values can be used for fraction f, and are within the scope of the invention, but a particularly beneficial and exemplary value is fifteen-sixteenths ($^{15}/_{16}$). Next, in step 1415, the instantaneous load of $SOI_n$ 140 is computed. This load is the current instantaneous queue size reported by $SOI_n$ 140 during its last reporting time (during superframe$_{j-2}$ 910), less the actual amount of data to be transmitted during the instant superframe$_{j-1}$ 915. This value can be calculated because that transmission time allocation (to be used during the current superframe$_{j-1}$915) has already been sent to $SOI_n$ 140.

In step 1420 the result of this last computation is multiplied by the fraction (1-f). In step 1425 the result of the computations in steps 1410 and 1420 are added, and this value of step 1425 becomes the new offered load "L", to be used in future computations. In step 1430, this L value is stored, to be used in step 1410 the next time the subroutine is entered for this $SOI_n$. The subroutine ends at step 1435, and the process returns to routine 1330 of FIG. 12.

Routine 1330 comprises the updating of the token bucket, and is illustrated in detail in FIG. 14. The update function begins in first step 1505. In step 1510, tokens are added to the token bucket for $SOI_n$ 140 which is equivalent to the current $SOI_n$'s sustained rate times the duration of the superframe. By way of example, if the authorized sustained rate is 10 Mb/s and the duration of the superframe is 8 ms, the number of tokens added would correspond to 10 Mb/s times 8 ms, or 80,000 bits. This represents the number of bits that can nominally be transmitted during a superframe, assuming the SOI has them to transmit, and no other factors modify what it is allowed to transmit.

In step 1515, the number of bits corresponding to the amount of data transmitted in the previous superframe are subtracted, to account for what had been transmitted at that time. In decision step 1520, it is determined whether the token bucket now contains more tokens than are equivalent to the current SOI's 140 burst limit. The inquiry to decision step 1520 may be positive if little had been transmitted in the previous superframe. If extra tokens were allowed to remain in the bucket, then the SOI 140 would be allowed to transmit more data than is allowed by the paid service level.

Thus, if there are more tokens than are equivalent to the burst limit, the inquiry to decision step 1520 yields a positive output, and the "yes" branch is followed to step 1525 where the extra tokens are removed, reducing the tokens in the bucket to the burst limit. If the inquiry to decision step 1520 is negative, then the "No" branch is followed to step 1530 where the subroutine ends.

Routine 1335 is another subprocess that can affect the amount of data that will be processed. This routine 1335 is shown in more detail in FIG. 15. In routine 1335, it is determined whether the rate at which the SOI 140 is trying to transmit exceeds its allowed peak rate. In step 1610, the maximum timeslot to be granted to the $SOI_n$, Tmaxm, is first set equal to $SOI_n$'S 140 sustained rate times the superframe duration (to compute how many bits the SOI 140 would be allowed to transmit in order to be transmitting at its allowed sustained rate), plus the current bucket allocation.

In decision step 1615, it is determined if this rate exceeds the allowed peak rate times the superframe duration. If the inquiry to decision step 1615 is positive, the "Yes" branch is followed to step 1620 in which the value of Tmaxn is changed so that it equals the allowed peak rate (times the superframe duration). After step 1620, the algorithm ends at step 1625 where the process returns. If the inquiry to decision step 1615 is negative, when the value of Tmaxn computed in step 1610 is less than the peak rate times the superframe duration, the "No" branch is followed to step 1625 where the algorithm ends. The process then returns to decision step 1340 of FIG. 12.

Figure 16:
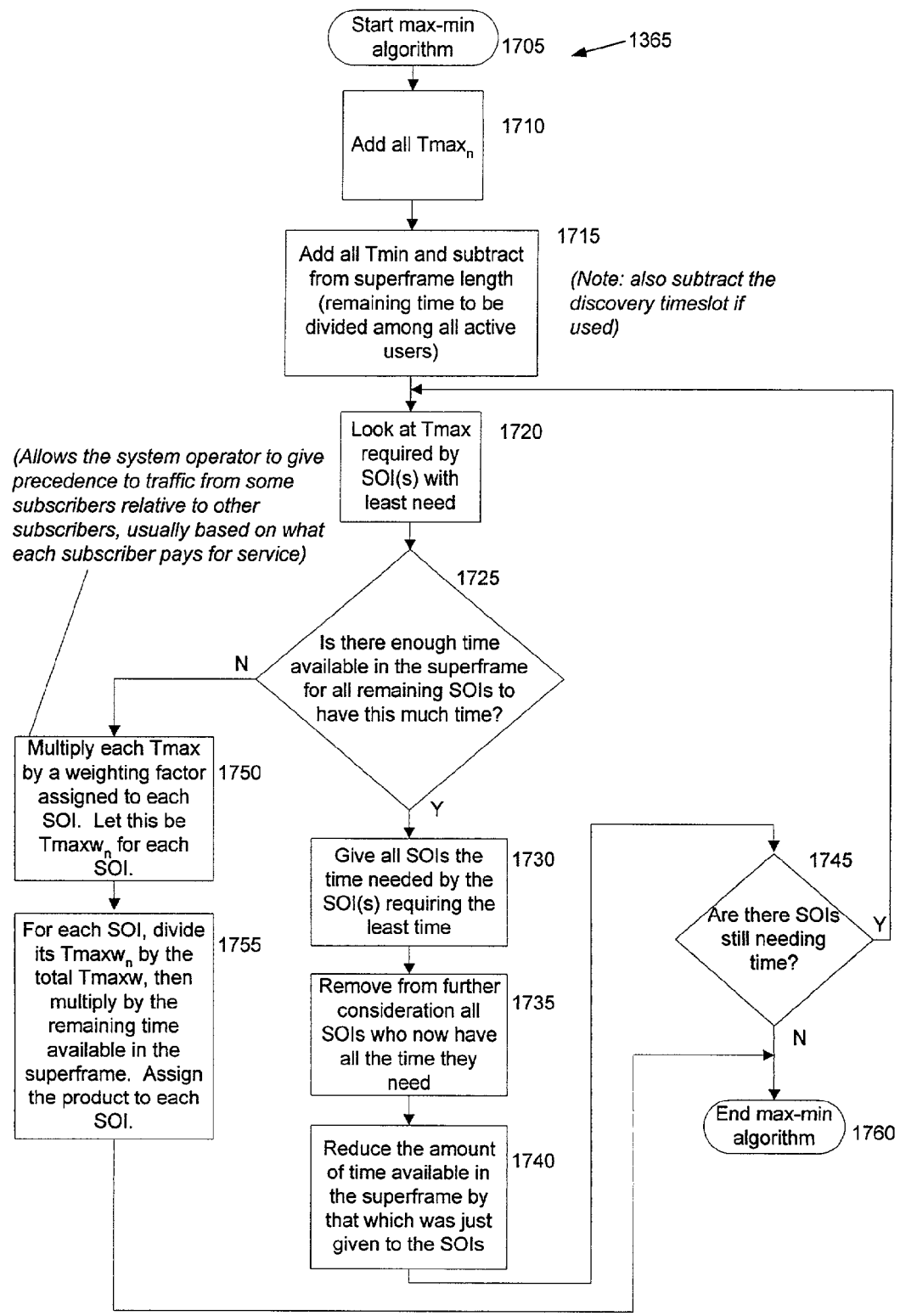
FIG. 16 is a logic flow diagram illustrating a more detailed exemplary subprocess of step 1365 in FIG. 12.

Referring now to FIG. 16, routine 1365 will be described below where the max-min algorithm that ultimately computes the amount of time each SOI 140 will be allowed to transmit in a subsequent superframe. Step 1705 is the first step of routine 1365. In step 1710, Tmaxn for all SOIs 140 is added to obtain a total Tmax. This can represent the amount of transmit time all SOIs 140 are requesting and to which they are entitled. The SOIs 140 will receive this transmit time if it does not exceed the transmit time available.

To determine how much transmit time is available, the total minimum transmit time, Tmin, from step 1345 or step 1350 for all SOIs 140 is subtracted from the length of the superframe in step 1715. The difference is the time left over after all SOIs 140 have been allowed to transmit their data that is considered essential. (If in the subsequent superframe in which these computations will be used to discover a new SOI 140, then the time of that discovery timeslot usually must also be subtracted at step 1715.)

The following steps will typically apportion the transmit time available in the superframe after allowing for the minimum transmit time Tmin of each SOI 140, and the discovery time if necessary. In step 1720, the ordering of SOIs 140 according to the maximum transmit time, Tmax, calculated in step 1360 is used. The SOI(s) 140 with the least need for bandwidth are considered first, in step 1720. In decision step 1725, it is determined whether there is enough time in the superframe to give the transmit time evaluated in step 1720 to every SOI 140. If the inquiry to decision step 1725 is positive where there is enough time (a likely outcome on the first time through the loop that will be shown shortly), then the "Yes" branch is followed to step 1730, in which each of the SOIs 140 is granted the transmit time that the least needy SOI 140 is receiving.

Since the least needy SOI(s) 140 is satisfied in step 1730, it is removed from further consideration in step 1735. In step 1740, the amount of time available in the superframe is updated by subtracting the total time just granted. In decision step 1745, it is determined if there are any more SOIs 140 needing additional time. In early iterations, the answer to decision step 1745 is likely yes, so "Yes" branch is followed back to step 1720.

After a few iterations, the number of SOIs 140 being considered has been reduced by the SOI(s) 140 that have been satisfied. Again in step 1720, the SOI(s) 140 with the next least need for bandwidth are considered. In one exemplary iteration, the current SOI(s) 140 may have already been granted the transmit time of the least needy SOI 140, but the remaining SOIs 140 may need more time for transmitting.

Decision step 1725 checks to see if the remaining transmit time needed by this SOI 140 can be given to all remaining SOIs 140. If the inquiry to decision step 1725 is positive, the "Yes" branch is again followed to step 1730 in which all remaining SOIs 140 are granted this additional transmit time or bandwidth. In step 1735, the SOI(s) 140 that was just satisfied is removed from further consideration, and in step 1740, the time just allocated is removed from the available time.

The loop between steps 1720 and 1745 repeats until one of two events occur: Either all SOIs 140 eventually are granted the total time that they need when they entered the subroutine, in which case decision step 1745 yields a "N" result and the subroutine ends. The alternative is that at some point there will not be enough time to allocate to all remaining SOIs 140, the time needed by the least needy of the remaining SOIs. In this case, the decision step 1725 yields a negative inquiry, and the "No" branch is followed to step 1750.

If the inquiry to decision step 1725 is negative, not all SOIs 140 are going to receive their requested and authorized bandwidth. It may be that the network service operator desires to allow one or more users to claim a disproportionate share of the remaining bandwidth. This can be accomplished by assigning a weighting factor to each SOI 140. The weighting factor is assigned when the service to a particular SOI 140 is established, but it is not used until this point in the process. When this point in the processing is reached, Tmax, in step 1750 is multiplied by the pre-assigned weighting factor. This product is referred to as Tmaxwn, where the subscript n can indicate that this is done for each SOI 140 involved (i.e., those SOIs 140 that have not been satisfied as to allowed transmit time).

In step 1755, the allocation to be given to each SOI 140 is computed. First, each SOI's Tmaxwn is divided by the sum of all Tmaxw for all units involved. This yields a fraction of the available time that the subject unit will have. The fraction is then multiplied by the time available, to yield the time the subject SOI can have. This is done in step 1755 for all SOIs 140 involved, so that at the end of step 1755, each SOI has its transmit time that is weighted according to its relative need and its pre-assigned weighting. The subroutine then terminates at step 1760, and the process returns to step 1370 of FIG. 12 and then back to step 1225 of FIG. 11, where the computed transmission times are communicated from the transceiver node 120 to each SOI 140.

An alternate embodiment not illustrated in FIG. 16 would be to add some steps between steps 1715 and 1720. These additional steps could test among all the tap multiplexers 440 to determine if every tap multiplexer 440 would have enough bandwidth to transmit the data it was about to accept back up to the headend. To do this, at step 1715, time available from all tap multiplexers 440 is added and compared to the time available on the transmission path back to the headend via optical waveguide transceiver 430. If this number is lower than the needs of all the tap multiplexers 440, a step similar to step 1755 could be added between steps 1715 and 1720.

Upstream Transmission Scheduling

The transceiver node 120 manages the upstream link or data path to the data service hub 110 by allocating bandwidth to each subscriber optical interface 140. This section of the detailed description describes that allocation process, and it illustrates several example configurations. Similar to downstream traffic, each channel that comprises an upstream data path of predetermined number of subscribers operates independently.

The transceiver node 120 manages upstream transmission by emulating a token bucket algorithm. Within the transceiver node 120, each subscriber optical interface 140 is typically provisioned with the following parameters:

Peak Rate. The peak rate is the maximum rate that a subscriber is allowed to transmit upstream packets.

Sustained Rate. The sustained rate is the profile rate for the subscriber. Normally this rate represents both the minimum bandwidth that the subscriber is assured of receiving and the maximum bandwidth that the subscriber can use over a long time period.

Burst Size. The amount of data that the subscriber can transmit at its peak rate during bursts. A special value indicates that the subscriber has no limits on its burst size.

Priority Weighting. The relative importance of this subscriber's data compared to other subscribers. The transceiver node 120 uses this value to arbitrate upstream transmissions when multiple subscriber optical interfaces 140 are attempting to transmit traffic bursts, the sum of which would exceed the link or upstream data path capacity.

Guaranteed Indication. An indication of whether or not the subscriber must always be guaranteed its sustained rate. If true, then the transceiver node 120 usually must allocates the indicated bandwidth for the subscriber, even when that subscriber is not currently active. This setting lets a subscriber begin transmitting at its sustained rate immediately after becoming active. If this indication is false, then, when the subscriber is idle, the transceiver node 120 may "borrow" bandwidth and allocate it to other subscriber optical interfaces 140.

The method of FIGS. 11–17 can have several key properties.

In one exemplary embodiment, the minimum allocation to each subscriber optical interface 140 can be either its sustained rate or, if that subscriber's bandwidth is not guaranteed, 256 Kbit/s.

In one exemplary embodiment, the maximum allocation to each subscriber optical interface 140 can be either its peak rate or its current token bucket's worth of burst, whichever is smaller.

In one exemplary embodiment, if all subscriber optical interfaces 140 cannot be granted their maximum, then bandwidth over and above the minimum is allocated using a weighted max-min algorithm. The weight factor is the product of a provisioned weight and a low-pass filtered measurement of buffer occupancy of each subscriber optical interface 140. The max-min constraint for each subscriber optical interface 140 can be its maximum allocation.

As an example of the method illustrated in FIGS. 11–17, the Table 2 presents a simplified example with three subscribers. The first column shows each subscriber's calculated limit; the second column shows the average offered load, and the third column indicates each subscriber's priority weighting.

TABLE 2

Subscriber Group comprising three subscribers
With these parameters, the transceiver node 120 can allocate bandwidth

|  | Limit | Average Load | Weight | Allocation |
|---|---|---|---|---|
| SOI 1 | 500 Mbit/s | 100 Kbit | 1 | 128 Mbit/s |
| SOI 2 | 500 Mbit/s | 150 Kbit | 2 | 362 Mbit/s |
| SOI 3 | 10 Mbit/s | 5 Kbit | 1 | 10 Mbit/s | according to the last column in the table. Since the third subscriber optical interface 140 in Table 2 has the lowest limit, it receives a full grant of 10 Mbit/s. (The other two subscriber optical interfaces 140 also receive 10 Mbit/s.) The third subscriber optical interface 140, in this exemplary embodiment, is the only subscriber that can be allocated its full limit, however, so the remaining bandwidth (470 Mbit/s) is divided among the remaining two subscribers. The amount each subscriber receives can be proportional to the product of its load and its weight. The second subscriber optical interface 140, consequently, receives 75% of the 470 Mbit/s in addition to the 10 Mbit/s. The first subscriber optical interface 140 receives 25% of 470 Mbit/s plus 10 Mbit/s.

Subscriber Optical Interface 140 Packet Processing

The subscriber optical interface 140 supports Quality of Service Management of upstream traffic through a two-priority queuing mechanism. The subscriber optical interface 140 can comprise a standard layer-2 Ethernet switch; the last mile link or upstream data path can be treated simply as another Ethernet port for the switch. To provide priority for voice and TDM over IP traffic, the subscriber optical interface 140 switch is configured to give priority to packets generated by internal applications. After prioritization, upstream packets are queued in the output buffer until they can be transmitted to the transceiver node 120. The output buffer provides first-in first-out service. The size of the buffer is provisioned separately for each subscriber optical interface 140.

BACKBONE NETWORK INTEGRATION

Quality of service (QoS) is most powerful when it can be managed globally across an entire network, and the present invention provides unparalleled opportunities for global QoS management across an entire backbone network. The basis for this integration is IP's differentiated services (diffserv) architecture.

Creating Service Level Agreements

The transceiver node (TN) 120 provides extensive support for managing service level agreements (SLAs) with subscribers. Although the TN 120 is necessarily only one component in an overall agreement, as the access network, it is critical. The following examines how the last mile link or upstream data path contributes to SLAs and how the QoS management functionality can support SLAs.

Components of an SLA

Service level agreements are typically more common with private network technologies such as ATM or Frame Relay. The power and flexibility of the TN's 120 QoS management, however, permits those same concepts to be extended to IP access networks. The same components that are part of traditional ATM or Frame Relay SLAs can be part of an data path SLA.

Peak Rate. The maximum rate at which the network will accept traffic bursts from the user, expressed in bits per second. The network discards traffic that exceeds the peak rate.

Sustained Rate. The minimum throughput that the network will provide to the user, expressed in bits per second.

Burst Size. The amount of traffic that the network will accept without pause at the user's peak rate, expressed in bits.

Maximum Latency. The worst-case latency the user's traffic will experience as it traverses the network.

Loss Rate. The percentage of traffic conforming to the peak rate, sustained rate, and burst size that the network may discard.

Of course, service providers can include other elements in their service level agreements. The transceiver node 120 provides a wealth of features that a service provider may position as value-added services. The TN 120 supports services such as the following:

Application Prioritization. Giving priority to key network applications (e.g. Virtual Private Network traffic).

Enhanced Statistics. Providing detailed traffic profiles and statistics to assist the user in network growth planning.

Active Monitoring. Continuously monitoring user traffic to provide early detection of network application faults (e.g. Web server failures).

Network Security. Providing encryption of traffic to the subscriber.

This part of the detailed description focuses on traditional SLA performance metrics. It examines how the Transceiver node 120 contributes to network performance, and how to provision downstream QoS management to meet SLA requirements. Table 3 below lists key parameters and values used in equations throughout this part of the description.

TABLE 3

| Inherent Link Characteristics | |
|---|---|
| C | Link Capacity (500 Mbit/s) |
| τ | Superframe Period (8 ms) |

TABLE 4

| Upstream Configuration parameters (per Subscriber) | |
|---|---|
| Bu | Upstream Burst Size (bit) |
| Pu | Upstream Peak Rate (bit/s) |
| Ou | SOI Output Buffer Size (bit) |
| Ru | Upstream Sustained Rate (bit/s) |
| Wu | Upstream Weight (unit-less) |

Rigorous SLAs and Oversubscription

Because business requirements differ among service providers and among subscribers, the transceiver node 120 allows typically providers significant flexibility in enforcing SLA performance metrics. Some deployments can require ironclad service level agreements; those environments require a conservative provisioning strategy. Conservative provisioning can provide extremely tight performance guarantees, but it generally results in a lower overall network utilization and, ultimately, greater capital expenditures.

In other deployments (residential Internet access, for example) SLAs are not common and may not be desirable. In those environments a more aggressive provisioning strategy may be effective. In general, meaningful SLAs are usually not enforceable when a network is provisioned aggressively; the resulting networks, however, may be operated at much higher utilization.

This part of the description considers both strict SLAs and slightly relaxed SLAs. Relaxed SLAs allow a modest amount of oversubscription of network resources; in exchange, the service provider cannot offer rigorous guarantees for all aspects of network performance.

Upstream Performance

For strict SLA environments, service providers can offer tight guarantees on upstream performance, including peak rate, sustained rate, burst size, latency, and loss. To do that, the provider must adhere to the following constraints.

The sum of the peak rates for all subscribers must be less than the link capacity. [$\Sigma P_U < C$]

The burst size for each subscriber must be equal to the output buffer size configured in that subscriber's Last Mile Gateway. [$B_U = O_U \forall SOIs$]

Under these conditions, it can be straightforward to relate transceiver node configuration parameters to SLA metrics.

TABLE 4

Transceiver Node 120 Configuration Parameters to SLA Metrics

| SLA Metric | Node Configuration Parameters |
|---|---|
| Peak Transmission Rate | equal to Upstream Peak Rate [=$P_U$] |
| Sustained Transmission Rate | equal to Upstream Sustained Rate [=$R_U$] |
| Transmission Burst Size | equal to Upstream Burst Size and SOI Output Buffer Size [=$B_U$] |
| Node Upstream Latency | equal to Upstream Burst Size divided by Upstream Sustained Rate plus superframe period [=$B_U/R_U + \tau$] |
| Node Upstream Loss Rate | 0 |

A more lenient deployment could relax the peak rate constraint and replace it with a constraint on sustained rates. In this environment, the constraints are as follows.

The sum of the sustained rates for all subscribers can be less than the link or upstream data path capacity. [$\Sigma R_U < C$]

The burst size for each subscriber can be set equal to the output buffer size configured in that subscriber's optical interface 140. [$B_U = O_U \forall SOIs$]

In this configuration, the worst-case peak transmission rate for a user may be less than its configured upstream peak rate. The worst-case upstream latency and loss rates also increase. Exact closed-form equations for SLA metrics are not possible in this configuration. Table 5 provides bounds on the SLA metrics that are suitable for SLA contracts.

TABLE 5

Bounds on SLA Metrics Suitable for SLA Contracts

| SLA Metric | Node Configuration Parameters |
|---|---|
| Peak Transmission Rate | either the Upstream Peak Rate or at least the weighted share of excess link capacity (capacity above the Upstream Sustained Rates of all LMGs, whichever is smaller [$\geq \min(P_U, R_U + (C - \Sigma R_U) \cdot B_U \cdot W_U/\Sigma(B_U \cdot W_U)$] |

TABLE 5-continued

Bounds on SLA Metrics Suitable for SLA Contracts

| SLA Metric | Node Configuration Parameters |
|---|---|
| Sustained Transmission Rate | equal to Upstream Sustained Rate [=$R_U$] |
| Transmission Burst Size | equal to Upstream Burst Size and SOI Output Buffer Size [=$B_C$] |
| Node Upstream Latency | no more than the value calculated by the following iterative equations:<br>$I_D \leftarrow (P_U - R_U) \cdot \tau$; $A_0 \leftarrow 0$; $S_0 \leftarrow R_U \cdot \tau$<br>$I_{l+1} \leftarrow I_l - S_l$; $A_{l+1} \leftarrow {}^{15}\!/_{16} \cdot A_l + {}^{1}\!/_{16} \cdot I_l$;<br>$S_{l+1} \leftarrow R_U \cdot \tau + A_l W_U \cdot (C - \Sigma R_U)/\Sigma(B_U \cdot W_U)$ delay $\leq i \cdot \tau \mid \Sigma S_l > (P_U \cdot \tau)$ |
| Node Upstream Loss Rate | no more than the amount by which the latency exceeds the rigorous case [$\leq$(Latency - $B_U/R_U - \tau$)/Latency] |

It should be understood that the foregoing relates only to illustrate the embodiments of the present invention, and that numerous changes may be made therein without departing from the scope and spirit of the invention as defined by the following claims.

What is claimed is:

1. A method for processing upstream packets of an optical network, comprising the steps of:
   for a group of subscriber optical interfaces in the optical network,
      receiving status messages from the subscriber optical interfaces;
      calculating reservation information for upstream transmission from the status messages;
      calculating a duration of upstream transmission time slots for each subscriber optical interface; and
      transmitting the calculated the duration of the upstream transmission time slot to each subscriber optical interface; and
      receiving upstream transmissions from each subscriber optical interface during respective calculated upstream transmission time slots.

2. The method of claim 1, wherein each status message indicates how much data that may be forwarded by a subscriber optical interface.

3. The method of claim 1, wherein the step of calculating a duration of upstream transmission time slots further comprises the steps of:
   determining whether a subscriber optical interface is active; and
   evaluating a queue size of a subscriber optical interface.

4. The method of claim 1, wherein the step of calculating a duration of upstream transmission time slots further comprises the step of filtering an offered load for a subscriber optical interface in the time domain.

5. The method of claim of claim 1, wherein the step of calculating a duration of upstream transmission time slots further comprises the step of adding to a token bucket a number of tokens that are approximately equal to a sustained rate of a subscriber optical interface.

6. The method of claim 1, further comprising the step of determining whether to hold upstream packets at a subscriber optical interface prior to transmission if an upstream transmission timeslot is not large enough to accommodate the upstream packets.

7. The method of claim 1, further comprising the step of determining whether to receive upstream packets from a particular subscriber optical interface based upon whether how much data other subscriber optical interfaces in a same subscriber group are planning to send.

8. The method of claim 1, further comprising the step of determining whether to receive upstream packets from a particular subscriber based upon whether a service level granted to a subscriber optical interface.

9. A computer-readable medium having computer-executable instructions for performing the steps recited in claim 1.

10. An optical network system comprising:
   a plurality of subscriber optical interfaces; and
   an optical tap routing device coupled to the plurality of subscriber optical interfaces, said optical tap routing device further comprising a memory device and central processing unit coupled to said memory device, wherein said central processing unit is programmed to perform the steps of:
      calculating a length of a time interval for upstream transmission by a subscriber with a token bucket algorithm; and
      obtaining at least one packet from each subscriber of the plurality of subscriber optical interfaces during the time interval such that collision of packets originating from different subscribers of the plurality of subscribers is substantially reduced.

11. The optical network system of claim 10, wherein the central processing unit is further programmed to perform the steps of:
   monitoring a bandwidth of a first subscriber optical interface; and
   offering a portion of the bandwidth not used by the first subscriber optical interface to one or more other second subscriber optical interfaces.

12. The optical network system of claim 10, wherein the central processing unit is further programmed to perform the step of determining whether to receive upstream packets from a particular subscriber based upon whether a service level granted to a subscriber optical interface.

13. A method for processing upstream packets of an optical network, comprising the steps of:
   for a group of subscribers in the optical network,
      receiving a request from a subscriber to transmit one or more upstream packets;
      determining whether the one or more upstream packets can be processed;
      holding the upstream packets at the subscriber if it is determined that the one or more upstream packets cannot be processed;
      sending a message to the subscriber indicating whether the one or more upstream packets can be processed; and
      receiving the upstream packets if it is determined that the one or more upstream packets can be processed.

14. The method of claim 13, wherein the step of determining whether upstream packets can be processed further comprises the step of calculating available upstream bandwidth with a token bucket algorithm.

15. The method of claim 13, wherein the step of determining whether upstream packets can be processed further comprises the step of calculating available upstream bandwidth based upon what other upstream packets other subscribers are planning to transmit.

16. The method of claim 13, wherein the step of determining whether upstream packets can be processed further comprises the step of determining an upstream bandwidth subscription service level of a subscriber.

17. The method of claim 13, wherein the step of determining whether upstream packets can be processed further comprises the step of calculating available upstream bandwidth based upon a total upstream data traffic load that is destined for the data service hub.

18. The method of claim 13, wherein the step of sending a message further comprises the step of sending a message indicating an amount of packets that can be transmitted upstream by a subscriber.

19. The method of claim 13, further comprising the step of allocating bandwidth between subscriber optical interfaces according to a weighted max-min mathematical algorithm.

20. A computer-readable medium having computer-executable instructions for performing the steps recited in claim 13.

21. A method for processing upstream packets of an optical network, comprising the steps of:
for a group of subscriber optical interfaces in the optical network,
receiving status messages from the subscriber optical interfaces;
calculating reservation information for upstream transmission from the status messages;
calculating a duration of upstream transmission time slots for each subscriber optical interface, wherein the step of calculating the duration of the upstream transmission time slots further comprises calculating the duration with a token bucket emulation algorithm;
transmitting the calculated the duration of the upstream transmission time slot to each subscriber optical interface; and
receiving upstream transmissions from each subscriber optical interface during respective calculated upstream transmission time slots.

22. The method of claim 21, wherein each status message indicates how much data that may be forwarded by a subscriber optical interface.

23. The method of claim 21, wherein the step of calculating a duration of upstream transmission time slots further comprises the steps of:
determining whether a subscriber optical interface is active; and
evaluating a queue size of a subscriber optical interface.

24. The method of claim 21, wherein the step of calculating a duration of upstream transmission time slots further comprises the step of filtering an offered load for a subscriber optical interface in the time domain.

25. The method of claim of claim 21, wherein the step of calculating a duration of upstream transmission time slots further comprises the step of adding to a token bucket a number of tokens that are approximately equal to a sustained rate of a subscriber optical interface.

26. The method of claim 21, further comprising the step of determining whether to hold upstream packets at a subscriber optical interface prior to transmission if an upstream transmission timeslot is not large enough to accommodate the upstream packets.

27. The method of claim 21, further comprising the step of determining whether to receive upstream packets from a particular subscriber optical interface based upon whether how much data other subscriber optical interfaces in a same subscriber group are planning to send.

28. The method of claim 21, further comprising the step of determining whether to receive upstream packets from a particular subscriber based upon whether a service level granted to a subscriber optical interface.

29. A computer-readable medium having computer-executable instructions for performing the steps recited in claim 21.

* * * * *

UNITED STATES PATENT AND TRADEMARK OFFICE
CERTIFICATE OF CORRECTION

PATENT NO. : 7,085,281 B2 Page 1 of 1
APPLICATION NO. : 10/045584
DATED : August 1, 2006
INVENTOR(S) : Stephen A. Thomas et al.

It is certified that error appears in the above-identified patent and that said Letters Patent is hereby corrected as shown below:

In Claim 1, Column 31, Line 36: "transmitting the calculated the duration of the upstream" should be changed to --transmitting the calculated duration of the upstream--

In Claim 5, Column 31, Line 55: "The method of claim of claim 1," should be changed to --The method of claim 1,--

In Claim 25, Column 34, Line 12: "The method of claim of claim 21," should be changed to --The method of claim 21,--

Signed and Sealed this

Twenty-first Day of November, 2006

JON W. DUDAS
*Director of the United States Patent and Trademark Office*